United States Patent
Wolf et al.

(10) Patent No.: US 7,951,008 B2
(45) Date of Patent: May 31, 2011

(54) NON-VOLATILE MEMORY MANAGEMENT TECHNIQUE IMPLEMENTED IN A GAMING MACHINE

(75) Inventors: Bryan D. Wolf, Reno, NV (US); Dwayne R. Nelson, Las Vegas, NV (US); James W. Stockdale, Clio, CA (US); Steven G. LeMay, Reno, NV (US)

(73) Assignee: IGT, Reno, NV (US)

( * ) Notice: Subject to any disclaimer, the term of this patent is extended or adjusted under 35 U.S.C. 154(b) by 1160 days.

(21) Appl. No.: 11/367,525

(22) Filed: Mar. 3, 2006

(65) Prior Publication Data

US 2007/0207854 A1    Sep. 6, 2007

(51) Int. Cl.
*A63F 13/00*   (2006.01)
*G06F 12/00*   (2006.01)

(52) U.S. Cl. .............. 463/43; 463/24; 463/29; 711/165; 711/170

(58) Field of Classification Search .................... 463/43, 463/24, 29; 711/165, 170
See application file for complete search history.

(56) References Cited

U.S. PATENT DOCUMENTS

| | | | |
|---|---|---|---|
| 3,931,504 A | 1/1976 | Jacoby | |
| 4,430,728 A | 2/1984 | Beitel et al. | |
| 4,454,594 A | 6/1984 | Heffron et al. | |
| 4,607,844 A | 8/1986 | Fullerton | |
| 4,948,138 A | 8/1990 | Pease et al. | |
| 5,274,827 A | 12/1993 | Haggarty et al. | |
| 5,344,144 A | 9/1994 | Canon | |
| 5,551,020 A | 8/1996 | Flax et al. | |
| 5,625,819 A | 4/1997 | Hoffer, Jr. | |
| 5,643,086 A | 7/1997 | Alcorn et al. | |
| 5,680,570 A | 10/1997 | Rantala et al. | |
| 5,761,647 A | 6/1998 | Boushy | |
| 5,851,149 A | 12/1998 | Xidos et al. | |
| 5,968,153 A | 10/1999 | Wheeler et al. | |
| 5,971,851 A | 10/1999 | Pascal et al. | |
| 5,978,808 A | 11/1999 | Wells et al. | |
| 6,065,148 A | 5/2000 | Obermeier et al. | |
| 6,070,202 A | 5/2000 | Minkoff et al. | |
| 6,071,190 A | 6/2000 | Weiss et al. | |
| 6,099,408 A | 8/2000 | Schneier et al. | |

(Continued)

FOREIGN PATENT DOCUMENTS

EP    1046996    10/2000

(Continued)

OTHER PUBLICATIONS

PCT International Search Report and Written Opinion in PCT/US2007/005337, mailed on Jun. 12, 2007.
U.S. Appl. No. 10/912,262, filed Aug. 4, 2004, Office Action mailed Jan. 30, 2006.
U.S. Appl. No. 10/243,104, filed Sep. 13, 2002, Office Action mailed Jan. 17, 2006.
Intel Corporation, "Flash Memory PCI Add-in Card for Embedded Systems", Application Note: AP-758, Sep. 1997.

(Continued)

*Primary Examiner* — James S McClellan
*Assistant Examiner* — Allen Chan
(74) *Attorney, Agent, or Firm* — Weaver, Austin, Villeneuve and Sampson LLP

(57) ABSTRACT

Various embodiments of the present invention are directed to different techniques for managing the storage of accumulated information in selected non-volatile memory sources at a gaming machine. In one implementation of the present invention relates to a technique for automatically and dynamically swapping critical data and/or other game related information between the non-volatile RAM and the alternate storage (e.g., disk drive) of a gaming machine as new games are activated and/or existing games are deactivated at the gaming machine.

33 Claims, 12 Drawing Sheets

U.S. PATENT DOCUMENTS

| | | | |
|---|---|---|---|
| 6,104,815 | A | 8/2000 | Alcorn et al. |
| 6,106,396 | A | 8/2000 | Alcorn et al. |
| 6,149,522 | A | 11/2000 | Alcorn et al. |
| 6,183,366 | B1 | 2/2001 | Goldberg et al. |
| 6,205,548 | B1 | 3/2001 | Hasbun |
| 6,253,374 | B1 | 6/2001 | Dresevic et al. |
| 6,264,561 | B1 | 7/2001 | Saffari |
| 6,286,088 | B1 | 9/2001 | Campbell et al. |
| 6,293,865 | B1 | 9/2001 | Kelly et al. |
| 6,394,907 | B1 | 5/2002 | Rowe |
| 6,408,368 | B1 | 6/2002 | Parady |
| 6,412,053 | B2 | 6/2002 | Bonola |
| 6,446,257 | B1 | 9/2002 | Pradhan et al. |
| 6,449,687 | B1 | 9/2002 | Moriya |
| 6,453,319 | B1 | 9/2002 | Mattis et al. |
| 6,454,648 | B1 | 9/2002 | Kelly et al. |
| 6,467,038 | B1 | 10/2002 | Piwonka et al. |
| 6,471,591 | B1 | 10/2002 | Crumby |
| 6,488,580 | B1 | 12/2002 | Robb |
| 6,503,147 | B1 | 1/2003 | Stockdale et al. |
| 6,589,119 | B1 | 7/2003 | Orus et al. |
| 6,609,186 | B1 * | 8/2003 | Veres et al. .................. 711/171 |
| 6,609,187 | B1 | 8/2003 | Merrell et al. |
| 6,685,559 | B2 | 2/2004 | Luciano et al. |
| 6,685,567 | B2 | 2/2004 | Cockerille et al. |
| 6,704,851 | B2 | 3/2004 | Siebert |
| 6,804,763 | B1 | 10/2004 | Stockdale et al. |
| 6,816,956 | B1 | 11/2004 | Benayon et al. |
| 6,839,823 | B1 | 1/2005 | See et al. |
| 6,863,608 | B1 | 3/2005 | LeMay et al. |
| 6,866,586 | B2 | 3/2005 | Oberberger et al. |
| 6,874,075 | B2 | 3/2005 | Jerding et al. |
| 6,962,530 | B2 | 11/2005 | Jackson |
| 7,111,141 | B2 | 9/2006 | Nelson |
| 7,116,782 | B2 | 10/2006 | Jackson et al. |
| 7,374,487 | B2 | 5/2008 | Nelson |
| 7,390,262 | B2 | 6/2008 | Nelson |
| 7,412,559 | B2 | 8/2008 | Stockdale et al. |
| 2002/0016896 | A1 | 2/2002 | Siebert |
| 2002/0026566 | A1 | 2/2002 | Awada et al. |
| 2002/0049909 | A1 | 4/2002 | Jackson et al. |
| 2003/0073497 | A1 | 4/2003 | Nelson |
| 2003/0203756 | A1 | 10/2003 | Jackson |
| 2004/0002379 | A1 | 1/2004 | Parrott et al. |
| 2004/0147313 | A1 | 7/2004 | Stanley et al. |
| 2004/0147314 | A1 | 7/2004 | LeMay et al. |
| 2004/0198496 | A1 | 10/2004 | Gatto et al. |
| 2004/0254013 | A1 | 12/2004 | Quraishi et al. |
| 2005/0010738 | A1 | 1/2005 | Stockdale et al. |
| 2005/0164795 | A1 | 7/2005 | Whitten et al. |
| 2005/0192099 | A1 | 9/2005 | Nguyen et al. |
| 2005/0216687 | A1 * | 9/2005 | Fu .................................. 711/165 |
| 2005/0223219 | A1 * | 10/2005 | Gatto et al. ................... 713/156 |
| 2007/0011427 | A1 | 1/2007 | Nelson |
| 2007/0207852 | A1 | 9/2007 | Nelson |
| 2007/0207854 | A1 | 9/2007 | Nelson et al. |
| 2007/0266220 | A1 | 11/2007 | Nelson |

FOREIGN PATENT DOCUMENTS

| | | |
|---|---|---|
| EP | 1255234 A2 | 6/2002 |
| GB | 2308171 | 6/1997 |
| JP | 58213281 | 12/1983 |
| WO | WO 0005652 | 2/2000 |

OTHER PUBLICATIONS

Dallas Semiconductor, "DS123: Flexible Non-volatile Controller with Lithium Battery Monitor," www.dalsemi.com, Nov. 1999.

Levinthal, Adam and Barnett, Michael, "The Silicon Gaming Odyssey Slot Machine," Feb. 1997, *COMPCON '97 Proceedings, IEEE* San Jose, CA; *IEEE Comput. Soc.*, pp. 296-301.

Australian Office Action dated Sep. 30, 2005 from a Corresponding AU Application No. 79469/01 (4 pages).

U.S. Appl. No. 11/367,497, filed Mar. 3, 2006.

Martinek et al., "Computerized Gaming System, Method and Apparatus", U.S. Appl. No. 09/520,405, filed Mar. 8, 2000 (28 pages).

U.S. Office Action dated Jan. 4, 2005 from corresponding U.S. Appl. No. 10/243,104 (8 pages).

U.S. Office Action dated Jun. 13, 2005 from corresponding U.S. Appl. No. 10/912,262 (11 pages).

U.S. Office Action dated Aug. 16, 2005 from corresponding U.S. Appl. No. 10/243,104 (11 pages).

U.S. Office Action dated Jan. 17, 2006 from corresponding U.S. Appl. No. 10/243,104 (18 pages).

Notice of Allowance dated May 12, 2006 and Allowed Claims from corresponding U.S. Appl. No. 10/243,104 (6 pages).

European Search Report dated Nov. 20, 2006 from corresponding EP Application No. 03752329.7.

U.S. Office Action dated Dec. 4, 2006 from corresponding U.S. Appl. No. 10/912,262 (18 pages).

European Search Report dated Feb. 14, 2007 from corresponding EP Application No. 03752329.7.

U.S. Office Action dated Jul. 16, 2007 from corresponding U.S. Appl. No. 10/912,262 (6 pages).

Notice of Allowance dated Jan. 5, 2007 and Allowed Claims from corresponding U.S. Appl. No. 11/517,743 (7 pages).

Notice of Allowance dated May 2, 2007 and Allowed Claims from corresponding U.S. Appl. No. 11/517,743 (4 pages).

U.S. Office Action dated May 4, 2007 from corresponding U.S. Appl. No. 11/517,743 (6 pages).

Notice of Allowance dated Aug. 1, 2007 and Allowed Claims from corresponding U.S. Appl. No. 11/517,743 (4 pages).

U.S. Office Action dated Jun. 5, 2007 from corresponding U.S. Appl. No. 11/729,407 (7 pages).

Notice of Allowance dated Aug. 24, 2007 and Allowed Claims from corresponding U.S. Appl. No. 11/729,407 (4 pages).

Australian Office Action dated May 15, 2009 issued in Application No. 2006249229.

Australian Office Action dated Jan. 16, 2008 issued in Application No. 2006249229.

Australian Office Action dated Dec. 10, 2008 issued in Application No. 2003270623.

Canadian Office Action dated Aug. 7, 2009 issued in Application No. 2,358,378.

Canadian Office Action dated Oct. 6, 2009 issued in Application No. 2,498,667.

European Office Action dated Dec. 12, 2008 issued in Application No. 07751864.5.

International Search Report and Written Opinion mailed on Oct. 16, 2007 issued in Application No. PCT/US2007/005132.

Russian Advisory Action dated Sep. 10, 2007 issued in Application No. 2005106847.

Notice of Allowance dated Dec. 19, 2007 and Allowed Claims issued in U.S. Appl. No. 11/729,407.

U.S. Office Action dated Oct. 2, 2009 issued in U.S. Appl. No. 11/367,525.

Australian Office Action dated Dec. 24, 2009 issued in Application No. 2003270623.

US Office Action dated Jan. 13, 2004 issued in U.S. Appl. No. 09/690,931.

US Notice of Allowance dated May 26, 2004 issued in U.S. Appl. No. 09/690,931.

US Notice of Allowability and Examiner's Amendment dated Jul. 13, 2004 issued in U.S. Appl. No. 09/690,931.

US Office Action dated May 13, 2010 issued in U.S. Appl. No. 11/879,463.

US Office Action dated Apr. 15, 2010 issued in U.S. Appl. No. 11/367,497.

International Search Report dated Nov. 19, 2004 issued in PCT/US2003/028748.

US Final Office Action dated Oct. 14, 2010 issued in U.S. Appl. No. 11/367,497.

US Notice of Allowance and Examiner Amendment dated Oct. 29, 2010 issued in U.S. Appl. No. 11/879,463.

Canadian Office Action dated Nov. 25, 2010 issued in Application No. 2,498,667.

\* cited by examiner

Fig. 11

NV Memory Address Mapping Table

| NVMR ID | NV Mem Address | Allocation Size (HEX Bytes) |
|---|---|---|
| 0 | 0x00001000 | 0x100 |
| 1 | 0x00001100 | 0x100 |
| 2 | 0x00001200 | 0x100 |
| 3 | 0x00001300 | 0x040 |
| 4 | 0x00001340 | 0x100 |
| ... | ... | ... |

US 7,951,008 B2

NON-VOLATILE MEMORY MANAGEMENT TECHNIQUE IMPLEMENTED IN A GAMING MACHINE

RELATED APPLICATION DATA

This application is related to U.S. Pat. No. 6,804,763, filed Oct. 17, 2000, and titled HIGH PERFORMANCE BATTERY BACKED RAM INTERFACE, by Stockdale et al.

This application is also related to U.S. patent application Ser. No. 10/243,104, (U.S. Publication No. US-2003-0073497-A1, Published on Apr. 17, 2003), filed Sep. 13, 2002, and titled DYNAMIC NV-RAM, by Nelson et al.

This application is also related to U.S. patent application Ser. No. 10/912,262, (U.S. Publication No. US-2005-0010738-A1, Published on Jan. 13, 2005), filed Aug. 4, 2004, and titled HIGH PERFORMANCE BATTERY BACKED RAM INTERFACE, by Stockdale et al. This application is incorporated herein by reference in its entirety and for all purposes.

This application is also related to U.S. patent application Ser. No. 11/367,497, titled GAME REMOVAL WITH GAME HISTORY, by Nelson et al., and filed concurrently herewith.

Each of these applications is incorporated herein by reference in its entirety and for all purposes.

BACKGROUND OF THE INVENTION

This invention relates to non-volatile storage for gaming machines such as slot machines and video poker machines. More particularly, the present invention relates to hardware and methods for facilitating non-volatile memory management techniques implemented in a gaming machine.

Advances in technology have led to gaming machines capable of providing a number of different games to a player. As a convenience to the player and as a way to extend his/her play time, multiple-game gaming machines can be a significant benefit to a casino. From the casino's perspective, a single gaming machine that is capable of playing a number of different games may provide a significant reduction in cost to the owner. It will also provide an enhanced experience to a player at reduced incremental cost to the casino owner.

In order to change the games stored on a gaming machine, a new game must be installed and mounted at the gaming machine. This often requires that an existing game be removed from the gaming machine memory. When this is performed, the contents of the non-volatile random access memory (NV-RAM) must be modified. In systems of prior art, the modification requires that the existing NV-RAM memory be cleared and replaced with a newly compiled memory map reflecting the addition or removal of particular game(s).

The process of re-compiling or re-initialization of the contents of the NV-RAM undesirably deletes all information related to the gaming machine's critical data. Such critical data may comprise game history information, accounting information, security information, player tracking information, or any other type of historical state related information.

The game history information may provide a record of outcomes for a number of rounds of play for a game in a gaming machine. For example, the game history information may be used to verify the payouts of a gaming machine so that a verification of a winning jackpot may be performed before a payout is made if suspicious activity is recognized. Game history may also be used, for example, to audit the types of jackpots generated over a specified number of rounds of play or to provide evidence that a gaming machine has been tampered with. Hence, this type of information is critical to the casino or gaming machine owner.

Information that provides a running count or history of the credits that go in and out of the gaming machine may provide valuable accounting information. For example, a gaming machine's cumulative number of credits may be based on the bills or coins collected, the amount of credits generated from the insertion of a credit card, or bonus credits created by inputting a PIN (personal identification number). This type of data is extremely important to a casino owner because it provides the revenue a gaming machine generates over a period of time.

Security information may provide information related to a tampering event on the gaming machine. The details of this information may include time of day, type of game, the amount wagered, the specific outcome, and any operational information, such as diagnostics related to the condition of the gaming machine when tampering occurred.

Player tracking information is also vital to providing valuable feedback regarding a player's preferences. A casino may track player information to provide the best and most desirable playing environment to the player. Whether it be type of game, denomination of game, length of play, amount played, or the like, these factors provide invaluable information to the casino owner on how he/she can better attract and maintain play from a player.

Hence, it is important that the various critical data previously described be securely maintained during the addition or removal of a game from a gaming machine and at all other times. The deletion of critical data from NV-RAM results in numerous drawbacks.

As touched on above, the prior art process for adding or removing a game from a gaming machine requires a complete recompilation of the NV-RAM memory, creating a new fixed map. This procedure is tedious because it may require the careful removal and replacement of the existing NV-RAM from the gaming machine. It is contemplated that the NV-RAM may be reprogrammed without removing it from the gaming machine; however, the process may result in downtime and inconvenience to a customer, resulting in loss of casino revenue. Additional time and labor is required to accomplish this task for each gaming machine. As a result, the incremental cost per machine may be substantial.

Prior art systems utilize a fixed memory map approach that does not permit the dynamic use of NV-RAM memory space. Hence, the fixed memory map reserves memory that is often unused and un-needed for a game during the mapping process. Were this memory space not reserved, it could be used to store critical data associated with another game or created from the addition of new game software. This memory allocation procedure results in a barrier to providing efficient and expedient game changes on a gaming machine.

Thus, there is a need in the art for a method and apparatus for gaming machine memory management that overcomes the drawbacks of the prior art.

SUMMARY OF THE INVENTION

Various aspects of the present invention are directed to different methods, systems, and computer program products for managing non-volatile memory resources at a gaming machine configured or designed to receive a wager on a game of chance. In at least one implementation, the gaming machine includes a first non-volatile memory source adapted to store accumulated information relating to activities at the gaming machine, and includes a second non-volatile memory source adapted to store accumulated information relating to activities at the gaming machine. In one implementation, the first non-volatile memory source corresponds to non-volatile RAM, and the second non-volatile memory source corresponds to disk drive or hard drive memory. A game activation request is received for activating or adding a first game at the gaming machine. In response to the game activation request, a memory allocation request is generated for allocating a first portion of memory space at the first non-volatile memory source. A determination is made as to whether there is sufficient memory space available at the first non-volatile memory source for allocating the first portion of memory space. A second game at the gaming machine may be identified for de-allocation in response to a determination that there is insufficient memory space available at the first non-volatile memory source for allocating the first portion of memory space. In one implementation, the second game has associated therewith a first existing allocated portion of memory space at the first non-volatile memory source. At least one procedure for de-allocating an existing allocated portion of memory space at the first non-volatile memory source may be automatically initiated in response to a determination that there is insufficient memory space available at the first non-volatile memory source for allocating the first portion of memory space. In at least one embodiment, a first existing allocated portion of memory space at the first non-volatile memory source may be de-allocated concurrently while preserving other existing allocated portion(s) of memory space at the first non-volatile memory source. In at least one implementation the accumulated information may include, for example, game history information, security information, accounting information, player tracking information, wide area progressive information, game state information, game usage information, game transactional information, game meter information, bonus of game information, player input information and/or other types of accumulated information which may be desired to be preserved in non-volatile memory.

Other aspects of the present invention are directed to different methods, systems, and computer program products for managing non-volatile memory resources at a gaming machine configured or designed to receive a wager on a game of chance. In at least one implementation, the gaming machine includes a first non-volatile memory source adapted to store accumulated information relating to activities at the gaming machine, and includes a second non-volatile memory source adapted to store accumulated information relating to activities at the gaming machine. In one implementation, the first non-volatile memory source corresponds to non-volatile RAM, and the second non-volatile memory source corresponds to disk drive or hard drive memory. A memory allocation request is received for allocating a first portion of memory space at the first non-volatile memory source. The memory allocation request relates to a first game which is to be activated or added at the gaming machine. The first portion of memory space may be allocated at the first non-volatile memory source and adapted for storing accumulated information associated with the first game. A determination may be made as to whether first game accumulated information relating to the first game is stored at the second non-volatile memory source. In at least one embodiment, the allocated first portion of memory space at the first non-volatile memory source may be populated with at least a portion of the first game accumulated information retrieved from the second non-volatile memory source in response to a determination that first game accumulated information relating to the first game is stored at the second non-volatile memory source.

Other aspects of the present invention are directed to different methods, systems, and computer program products for managing non-volatile memory resources at a gaming machine configured or designed to receive a wager on a game of chance. In at least one implementation, the gaming machine includes a first non-volatile memory source adapted to store accumulated information relating to activities at the gaming machine, and includes a second non-volatile memory source adapted to store accumulated information relating to activities at the gaming machine. In one implementation, the first non-volatile memory source corresponds to non-volatile RAM, and the second non-volatile memory source corresponds to disk drive or hard drive memory.

A game de-allocation request is received for de-allocating a first game at the gaming machine. In one implementation, the first game has associated therewith a first allocated portion of memory space at the first non-volatile memory source, and the first allocated portion of memory space includes first game accumulated information relating to at least one play of the first game at the gaming machine. A first memory de-allocation request for de-allocating the first portion of memory space at the first non-volatile memory source may be generated in response to the game de-allocation request. A first portion of the first game accumulated information may be copied to a second allocated portion of memory space at the second non-volatile memory source in response to the first memory de-allocation request. In at least one implementation, the first allocated portion of memory space at the first non-volatile memory source may then be de-allocated. Additionally, in at least one implementation, the information stored at the second non-volatile memory source may first be converted into converted first game accumulated information which is able to be accurately interpreted even at times when game code relating to the first game is unavailable for access. In one embodiment, information stored at the first allocated portion of memory space may be updated to include pointer information relating a memory access reference parameter usable for accessing information stored at the second allocated portion of memory space.

Other aspects of the present invention are directed to different methods, systems, and computer program products for managing non-volatile memory resources at a gaming machine configured or designed to receive a wager on a game of chance. In at least one implementation, the gaming machine includes a first non-volatile memory source adapted to store accumulated information relating to activities at the gaming machine, and includes a second non-volatile memory source adapted to store accumulated information relating to activities at the gaming machine. In one implementation, the first non-volatile memory source corresponds to non-volatile RAM, and the second non-volatile memory source corresponds to disk drive or hard drive memory. A first data access request is received for accessing a first portion of accumulated information relating to a first previous state of the gaming machine. A determination may be made as to whether the requested first portion of accumulated information is stored at the first non-volatile memory source or the second non-volatile memory source. The first portion of accumulated information may be accessed at the first non-volatile memory source in response to a determination that the first portion of accumulated information is stored at the first non-volatile memory source. The first portion of accumulated information may be accessed at the second non-volatile memory source in response to a determination that the first portion of accumulated information is stored at the second non-volatile memory source. In one implementation, information stored at the first non-volatile memory source may be accessed in order to determine whether the first portion of accumulated information is stored at a first non-volatile memory source or second non-volatile memory source. According to one embodiment, the first non-volatile memory source may include non-volatile RAM, and the second non-volatile memory source may include disk drive memory.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 11 shows and exemplary portion of a Non-Volatile Memory Address Mapping Table 1100 in accordance with a specific embodiment of the present invention.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not obscure the present invention.

Gaming Machine

Figure 1:
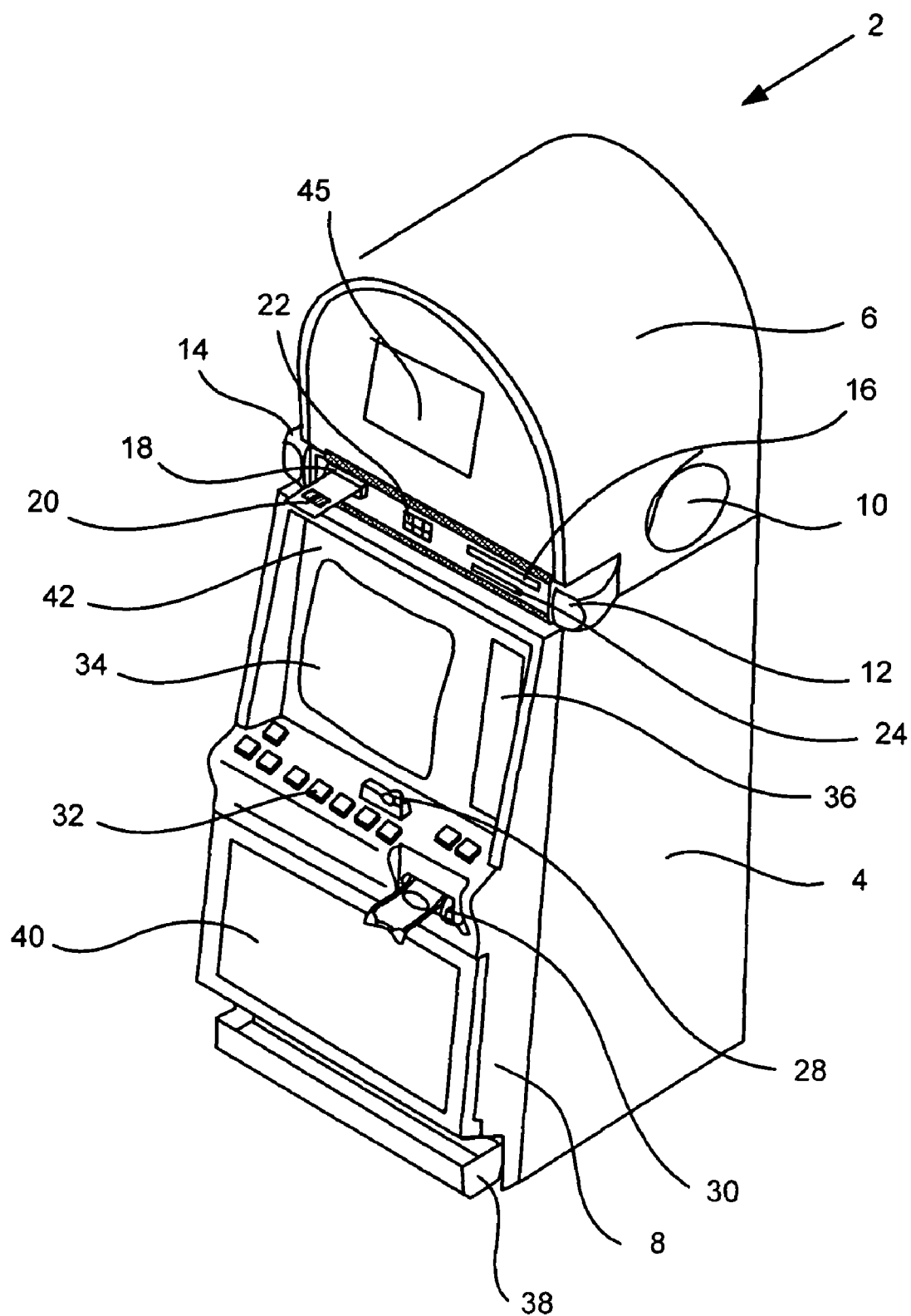
FIG. 1 shows a perspective view of an exemplary gaming machine 2 in accordance with a specific embodiment of the present invention.

FIG. 1 shows a perspective view of an exemplary gaming machine 2 in accordance with a specific embodiment of the present invention. As illustrated in the example of FIG. 1, machine 2 includes a main cabinet 4, which generally surrounds the machine interior (illustrated, for example, in FIG. 3) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. According to a specific embodiment, the devices may be controlled by code executed by a master gaming controller housed inside the main cabinet 4 of the machine 2. In specific embodiments where it may be required that the code be periodically configured and/or authenticated in a secure manner, the technique of the present invention may be used for accomplishing such tasks.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

As illustrated in the example of FIG. 1, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 1. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567, filed Aug. 8, 2001 and titled "Process Verification," and U.S. patent application Ser. No. 11/221,314, titled "Data Pattern Verification in a Gaming Machine Environment," filed Sep. 6, 2005, each of which is incorporated herein by reference in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System", which is incorporated herein in its entirety and for all purposes.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "SECURED VIRTUAL NETWORK IN A GAMING ENVIRONMENT", naming Nguyen et al. as inventors, filed on Mar. 10, 2005, herein incorporated in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 2:
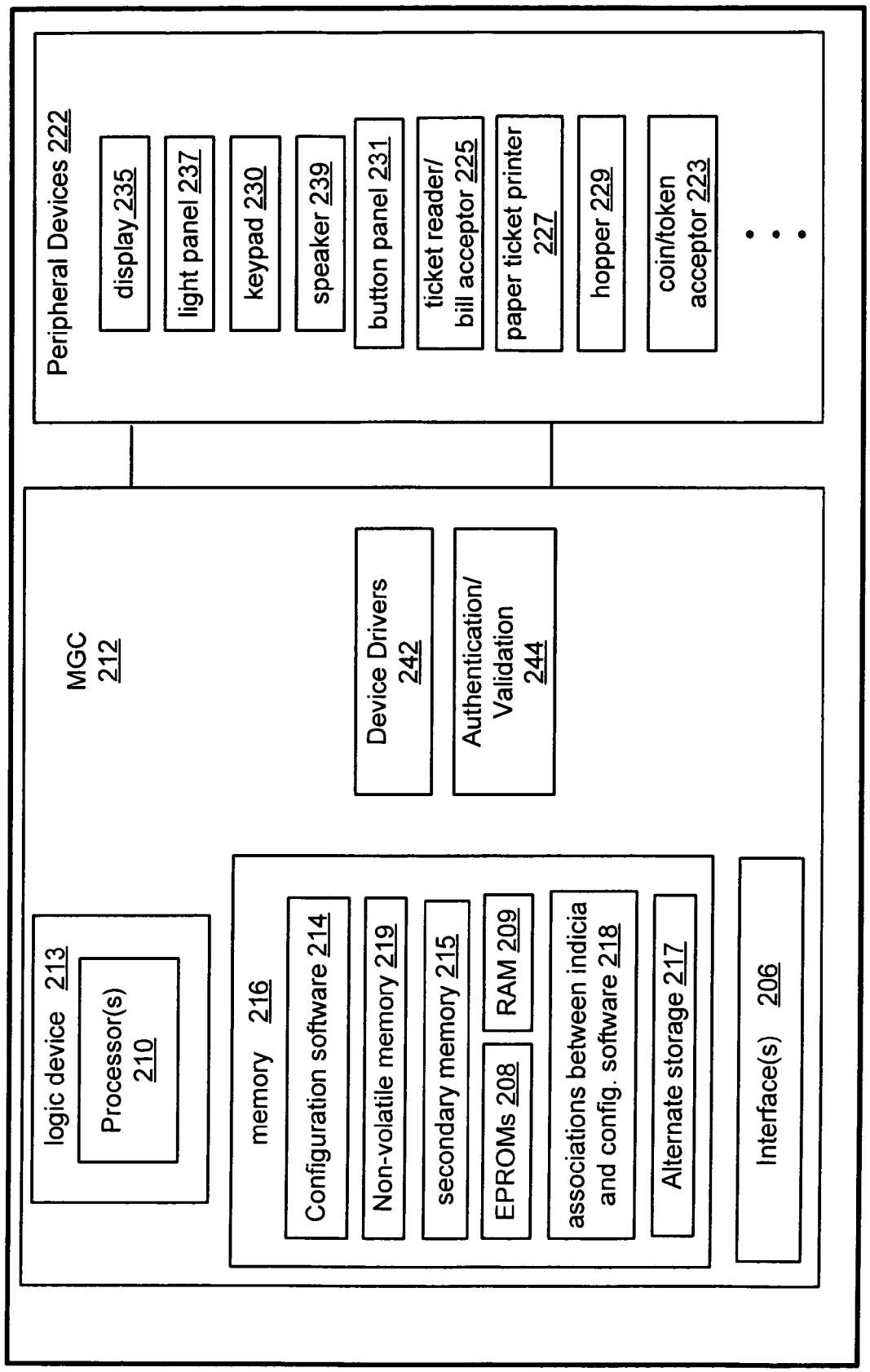
FIG. 2 is a simplified block diagram of an embodiment of gaming machine 2 showing processing portions of a configuration/reconfiguration system in accordance with the present invention.

FIG. 2 is a simplified block diagram of an exemplary gaming machine 200 in accordance with a specific embodiment of the present invention. As illustrated in the embodiment of FIG. 2, gaming machine 200 includes at least one processor 210, at least one interface 206, and memory 216.

In one implementation, processor 210 and master gaming controller 212 are included in a logic device 213 enclosed in a logic device housing. The processor 210 may include any conventional processor or logic device configured to execute software allowing various configuration and reconfiguration tasks such as, for example: a) communicating with a remote source via communication interface 206, such as a server that stores authentication information or games; b) converting signals read by an interface to a format corresponding to that used by software or memory in the gaming machine; c) accessing memory to configure or reconfigure game parameters in the memory according to indicia read from the device; d) communicating with interfaces, various peripheral devices 222 and/or I/O devices 211; e) operating peripheral devices 222 such as, for example, card reader 225 and paper ticket reader 227; f) operating various I/O devices such as, for example, display 235, key pad 230 and a light panel 216; etc. For instance, the processor 210 may send messages including configuration and reconfiguration information to the display 235 to inform casino personnel of configuration progress. As another example, the logic device 213 may send commands to the light panel 237 to display a particular light pattern and to the speaker 239 to project a sound to visually and aurally convey configuration information or progress. Light panel 237 and speaker 239 may also be used to communicate with authorized personnel for authentication and security purposes.

Peripheral devices 222 may include several device interfaces such as, for example: card reader 225, bill validator/paper ticket reader 227, hopper 229, etc. Card reader 225 and bill validator/paper ticket reader 227 may each comprise resources for handling and processing configuration indicia such as a microcontroller that converts voltage levels for one or more scanning devices to signals provided to processor 210. In one embodiment, application software for interfacing with peripheral devices 222 may store instructions (such as, for example, how to read indicia from a portable device) in a memory device such as, for example, non-volatile memory, hard drive or a flash memory.

The gaming machine 200 also includes memory 216 which may include, for example, volatile memory (e.g., RAM 209), non-volatile memory 219 (e.g., FLASH memory, EPROMs, battery backed RAM, etc.), unalterable memory (e.g., EPROMs 208), alternate storage 217 (e.g., non-volatile memory implemented using disk drive(s), flash memory, remote storage, etc.), etc. The memory may be configured or designed to store, for example: 1) configuration software 214 such as all the parameters and settings for a game playable on the gaming machine; 2) associations 218 between configuration indicia read from a device with one or more parameters and settings; 3) communication protocols allowing the processor 210 to communicate with peripheral devices 222 and I/O devices 211; 4) a secondary memory storage device 215 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming machine to communicate with local and non-local devices using such protocols; etc. Typically, the master gaming controller 212 communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers 242 may be stored in memory 216. Example of different types of device drivers may include device drivers for gaming machine components, device drivers for peripheral components 222, etc. Typically, the device drivers 242 utilize a communication protocol of some type that enables communication with a particular physical device. The device driver abstracts the hardware implementation of a device. For example, a device drive may be written for each type of card reader that may be potentially connected to the gaming machine. Examples of communication protocols used to implement the device drivers 259 include Netplex 260, USB 265, Serial 270, Ethernet 275, Firewire 285, I/O debouncer 290, direct memory map, serial, PCI 280 or parallel. Netplex is a proprietary IGT standard while the others are open standards. According to a specific embodiment, when one type of a particular device is exchanged for another type of the particular device, a new device driver may be loaded from the memory 216 by the processor 210 to allow communication with the device. For instance, one type of card reader in gaming machine 200 may be replaced with a second type of card reader where device drivers for both card readers are stored in the memory 216.

In some embodiments, the gaming machine 200 may also include various authentication and/or validation components 244 which may be used for authenticating/validating specified gaming machine components such as, for example, hardware components, software components, firmware components, information stored in the gaming machine memory 216, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

In some embodiments, the software units stored in the memory 216 may be upgraded as needed. For instance, when the memory 216 is a hard drive, new games, game options, various new parameters, new settings for existing parameters, new settings for new parameters, device drivers, and new communication protocols may be uploaded to the memory from the master gaming controller 104 or from some other external device. As another example, when the memory 216 includes a CD/DVD drive including a CD/DVD designed or configured to store game options, parameters, and settings, the software stored in the memory may be upgraded by replacing a first CD/DVD with a second CD/DVD. In yet another example, when the memory 216 uses one or more flash memory 219 or EPROM 208 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

It will be apparent to those skilled in the art that other memory types, including various computer readable media, may be used for storing and executing program instructions pertaining to the operation of the present invention. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter.

Additional details about other gaming machine architectures, features and/or components are described, for example, in U.S. patent application Ser. No. 10/040,239, entitled, "GAME DEVELOPMENT ARCHITECTURE THAT DECOUPLES THE GAME LOGIC FROM THE GRAPHICS LOGIC," and published on Apr. 24, 2003 as U.S. Patent Publication No. 20030078103, incorporated herein by reference in its entirety for all purposes.

As mentioned previously, there is a need to preserve certain types of game play data from gaming machines. Such data may be necessary to address disputes that players may have with a casino or other gaming establishment over whether or not a winning combination occurred, the amount of pay out due, etc. Further, casino operators sometimes need the same or related information for other reasons such as re-creating events that led to a malfunction, collecting statistical information before a power failure, logging the types of games played over the life of a particular machines etc.

Among the types of commonly preserved data is so-called "critical data" or "critical game information," which must be maintained by casinos or other gaming machine establishments. Such data may be stored as simple text and/or graphics. In some cases, entire frames of video data may be captured for this purpose. See for example U.S. patent application Ser. No. 10/758,828 filed Jan. 15, 2004, herein incorporated by reference in its entirety for all purposes.

Typically gaming machines are provided with finite resources for storing the various types of game play data. Such resources often take the form of non-volatile RAM (NV-RAM), magnetic disk mass storage, etc.

Gaming regulators, such as the Nevada gaming commission, require that gaming machines save critical data for a certain length of time (e.g., a set number of games) before allowing older critical data to be purged from a gaming machine. To this end, gaming machine manufacturers sometimes store such data in battery-backed non-volatile RAM. This allows critical data to be stored without power for long periods of time. See the discussion in U.S. Pat. No. 6,804,763, herein incorporated by reference in its entirety for all purposes.

An ancillary issue arises with regard to preserving game data when a game is being removed from a gaming machine. Traditionally, a given gaming machine was born with and died with a single game, e.g., a video poker game. Modern technology allows games to be removed for various reasons such as because a license for the game has expired or because replacement with a different game is expected to increase revenue. A technology enabling such situations is downloadable code for individual games that can be executed on a given gaming machine or other terminal. In some terminals, only a single game is available for play at any given time. In other terminals, multiple games are available for user selection at particular instants in time.

Electronic downloading of the necessary software into the gaming machine allows a gaming machine to access scalable server farms and databases to select a set of games it needs from the game library. A desire of casino operators after games are safely downloaded is the ability to electronically move the games around on the casino floor. Casino managers routinely move slot machines (entire slot machine) around the floor in search of the optimum layout. A popular new game might be located near the door, but an older game might be better suited in the back. A Harley-Davidson™ game might be moved to the front during a Biker's convention, etc.

Currently, when a game is removed from a gaming machine, that "entire game," including the game image and all statistical, counter, and historical information is deleted together, at one time. The "game image" refers to executable code for playing a given game on a master gaming controller. There are various difficulties with this approach. First, because the history of a game must be preserved, some special effort is required to capture that history before the game is wiped clean from the terminal. In some cases, this is done manually by an attendant, who may review meters and other records as necessary at the time the game is removed. In addition or alternatively, casino personnel may instruct a server to capture recent accounting and/or game history information as necessary. Obviously, the operator intervention required for these efforts represents some burden for the casino or other gaming establishment.

On top of the efforts required to capture critical data and other relevant game play data, an operator may be required to reset all manner of ancillary conditions associated with the game before a new game can be installed on the terminal. For example, the operator may be required to re-seed a random number generator, reset various meters, set background colors associated with games, etc.

As disclosed in related patent application Ser. No. 10/243,104, a method and apparatus are taught for dynamically downloading or removing a game(s) stored on a gaming machine without altering or deleting "critical data" unrelated to the added or removed game(s). The term critical data may be defined as data that records the past and present states of a gaming machine. Examples of such states include a game's history, accounting, security information, or the like. This type of critical data may be stored in a gaming machine's non-volatile memory. In one embodiment when downloading or removing a game(s) in a gaming machine occurs, critical data is added or removed by allocating or de-allocating memory space in a non-volatile random access memory (NV-RAM) of a gaming machine.

Gaming regulators, such as the Nevada gaming commission, require that gaming machines prohibit the writing of code, data and/or other gaming information to gaming machine disk drives by sources other than trusted memory sources which have been properly verified and authenticated. Because of such regulatory constraints, it has been conventional practice in the gaming industry to design and implement mechanisms for preserving critical data in the gaming machine's non-volatile RAM without utilizing memory storage at the gaming machine's disk drive(s). Thus, for example, a number of embodiments of patent application Ser. No. 10/243,104 relate to methods to maximize the use of free memory space in an NV-RAM during the course of the gaming machine's operation and maintenance. A number of embodiments of that patent application also relate to methods to efficiently utilize the memory space in an NV-RAM when a game is downloaded or removed from a gaming machine. In one embodiment, a method is disclosed for dynamically sizing the NV-RAM memory space based on the gaming machine's operational requirements.

Contrary to conventional practice, however, various embodiments of the present invention are directed to different techniques for managing the storage of game related data and/or critical data in both non-volatile RAM and alternate storage of the gaming machine which, for example, may include one or more disk drives. For example, one implementation of the present invention is directed to a technique for automatically and dynamically swapping critical data and/or other game related information between the non-volatile RAM (NV-RAM) and the alternate storage (e.g., disk drive) of the gaming machine as new games are added and/or existing games are removed to/from the gaming machine. Further, in at least one implementation, the swapping of the critical data may occurred during run-time of the gaming machine, while the gaming machine is available for play and/or in game play mode.

In at least one embodiment, the technique of the present invention is adapted to take advantage of the fact that games may be divided into different portions having differing preservation needs. These different portions may be saved to set locations for set periods of time when a downloaded game that was once available on a given gaming terminal must be disabled, removed or otherwise made unavailable on the gaming terminal. The removal process may be automated or controlled remotely, although this is not strictly required. Further, the invention may be implemented using directories of the various game components for multiple downloaded games available to a single gaming terminal.

As suggested previously, one aspect of the present invention involves preserving a portion of a game containing specified game information, such as historical information, when a game is removed from a gaming terminal. In accordance with this invention, a game may be any game of chance such as, for example, slot games, video poker games, lottery games, and the like. A gaming terminal is generally any apparatus that supports playing a downloaded game. Examples include stand alone and networked gaming machines, personal computers, cell phones, personal digital assistants, and the like. FIG. 1 depicts a gaming machine, which represents a specific embodiment of a gaming terminal for implementing the present invention. In order support downloading, a gaming terminal may be connected via a network to a source of games for downloading. Of course, this is not strictly required because, for example, games may be downloaded from portable memory devices that are temporarily resident on the gaming terminal.

In accordance with certain embodiments of the invention, a downloaded game has multiple portions or components, which have differing preservation requirements. When a downloaded game is to be removed from a gaming terminal, the various components are treated differently in terms of (1) whether or not they are preserved, (2) where they are stored, and (3) for how long they are stored. Thus, embodiments of the invention pertain to partial or staged removal of a downloaded game from a gaming terminal.

A typical game of chance contains logic and data for, among other things, processing player inputs, determining a game outcome, presenting a game display to the player (via typically video and audio output), and storing various pieces of information about the game. One way to visualize a game is as combination of non-modifiable portions and accumulative portions. The non-modifiable portions generally include, at least, executable code for implementing the game, which code processes user inputs, calculates game outcomes (using typically a random number generator), and presents the game to the user on the gaming terminal. The accumulative portions of a game are typically data and associated contextual information specifying such things as game history, game meter values, various types of accounting information, specific frames from the game play, game outcomes, numbers of games played, denominations played, and the like. In some cases, the accumulative portion comprises minimal state information required to re-create a game play using executing game code. In general, accumulative components are, as their name suggests, portions of the game that are accumulated and therefore saved at least temporarily.

In certain embodiments, the accumulative portions of the game may be divided into various subsets of data or derived components distinguished based on content. For example, one subset or derived component may be deemed particularly important for long-term storage and referred to as "permanent" or "global" data. Examples of global data include: cash received into the gaming machine; cash paid out of the gaming machine; number of games played; that a particular game was resident and/or played on a particular terminal at one time in the past; and the like. Examples of derived global data include, for example, win/loss ratios, average payback, and the like. Obviously, designating particular accumulative data as "permanent" is a choice made based upon the importance attached to that data by the particular gaming establishment or regulatory body having control or jurisdiction.

Some accumulative data may be designated as critical data or critical game information. The designation of some accumulative data as "critical" is dependent upon the requirements of controlling entities such as casinos and governmental bodies. In typical cases, critical data may comprise one or more of game history information, security information, accounting information, player tracking information, wide area progressive information and game state information. A few specific examples of critical data may include, for example, one or more of the following: (1) Main door/prop door/Cash door openings and closings, (2) Bill insert message with the denomination of the bill, (3) Hopper tilt, (4) Bill jam, (5) Reel tilt, (6) Coin in and Coin out tilts, (7) Power loss, (8) Card insert, (9) Card removal, (10) Jackpot, (11) Abandoned card (12) querying the non-volatile memory for the current credit available on the gaming machine, (13) reading the credit information from a player's card, (14) adding an amount of credits to the gaming machine, (15) writing to a player's card via the card reader and the device drivers to deduct the amount added to gaming machine from the card and (16) copying the new credit information to the non-volatile memory. Such information may be required to be kept by, for example, various gaming regulatory bodies (e.g., the Nevada Gaming Commission) for a period of time; e.g., 75 game plays after the information was accumulated.

The accumulative data to be saved may take the form of text, graphics, frames, video clips, etc. In the simplest case, it is merely textual data describing a game's state, history, statistics, etc. A more memory-intensive form of data storage stores frames (essentially bit maps of video still shots) for selected portions of the game presentation; e.g., frames associated with user inputs and presentation of game outcomes. Some of these frames may have embedded or associated data providing specific details such as state, statistics, etc. as described above. Frame capture for the purpose of preserving accumulative data is described in, for example, U.S. patent application Ser. No. 10/758,828 filed Jan. 15, 2004, herein incorporated by reference in its entirety for all purposes. Yet another way to save relevant game play information is via a game play sequence that re-presents the game as it appeared originally. This involves presentation of a series of frames and associated events, including, for example, user interactive events. Such may be implemented using a series of critical or desired snapshots and/or screenshots, a movie or video clips of a game play, and/or other mechanisms representing the game play information. To implement this type of replay, it may be desirable to preserve essential state information about the game and then re-execute the game code using such state information.

In certain embodiments, the non-modifiable component of a game is saved on a hard drive memory and temporarily loaded into main memory for execution. The accumulative data component (including the global data) is sometimes stored on a non-volatile RAM. See U.S. Pat. No. 6,804,763, herein incorporated by reference in its entirety for all purposes. In certain other embodiments, all components of a game may be stored together on NV-RAM, which takes the form of flash memory, MRAM, or other non-volatile storage media which can inexpensively store large quantities of data. Traditionally, NV-RAM has been chosen as a preferred non-volatile storage medium for storing critical data because it is able to handle relatively large data bursts in real time, without introducing delays in the gaming machine system. By the same reasoning, hard drive memory has traditionally not been desirable as a preferred non-volatile storage medium for storing critical data because of its relatively slow access time compared to NV-RAM, for example.

To trigger a change in storage location or state of a particular game component (accumulative and/or un-modifiable), a downloaded game (or games) that was once available on gaming terminal may be made unavailable for future play. As indicated, a game may be deactivated for various reasons such as expiration of a license to the game, poor revenue generation, etc. A game may be deactivated by one or more of the following techniques: (1) deleting at least a portion of the game from all memory on the gaming terminal, (2) moving at least a portion of the game to a different memory device within the terminal or outside the terminal, and (3) rendering the game inactive without moving it from the gaming terminal memory device on which it was once stored. In situation (3), a software mechanism may be control player access to the game, e.g., a flag may be set indicating that the game cannot be presented to a user. Otherwise, the game components may be maintained, as they were, stored on the gaming terminal when the game was available for play.

Depending on the needs of the gaming establishment or the design of a gaming terminal, memory for storing game components after deactivation may be found in any one or more of (1) a local gaming terminal where a downloaded game is played, (2) a peer machine of the terminal, and/or (3) a server networked with the gaming terminal. Any one of these machines may include dedicated NV-RAM, main memory volatile RAM, hard drives, etc. They may also include temporarily attached portable memory such as optical disks, semiconductor memory devices, etc. As indicate, the various game components may be independently and separately stored on any of these devices.

Depending on which forms of accumulative data are employed, a storage procedure for preserving game data after deactivation may dictate different types of and locations of storage media. For example, simple textual data, particularly compacted textual data, may be conveniently stored in NV-RAM, while frames might be more conveniently stored on a mass storage device associated with a server or other network component separate from the gaming terminal where the game play of interest took place.

The accumulative component of a game is optionally compacted or compressed when the game is deactivated or removed from a gaming terminal. Compaction may be performed either on the gaming terminal itself or at some other location, where the accumulative component resides for a period of time. Data compaction and compression techniques are well known to those of skill in the art. Generally, data compaction involves a reduction of the number of data elements, bandwidth, cost, and time for the generation, transmission, and storage of data without loss of information by eliminating unnecessary redundancy, removing irrelevancy, or using special coding. Examples of data compaction methods are the use of fixed-tolerance bands, variable-tolerance bands, slope-keypoints, sample changes, curve patterns, curve fitting, variable-precision coding, frequency analysis, and probability analysis.

In accordance with certain embodiments of the present invention, various components of a game may be stored for various lengths of time after deactivation as specified by, for example, a casino policy. The lengths of storage time specified for particular components may be set according to the needs of a gaming establishment, one of which comprises requirements of regulatory bodies. The lengths of time may be measured in terms of a number of relevant events or in terms continuous time (minutes, days, weeks, months, years, etc.). Examples of event-based storage times include terminal specific actions such number of games played on a terminal, number of different players using player tracking cards on the terminal, number of separate payouts, total value of payouts, number of bonus events realized, etc.

Assume now that after a downloaded game has been deactivated, a user, regulator, and/or gaming establishment needs to review the accumulated data associated with game play of the downloaded game. Such review may involve, in the simplest case, presentation of the relevant data (e.g., critical data or other game history data) in textual form. Alternatively, the review may comprise re-creating the presentation of the game to the player by executing game code (un-modifiable component) using game state data stored after the game was removed. In other situations where particular frames or video clips were maintained as accumulated data after the game was deactivated or removed, the review may simply involve viewing individual frames or video from the stored data.

Any of the above types of review can be performed at any location that has been established (or merely chosen as convenient) by the gaming establishment or regulator. For example, the review may take place at the gaming terminal where the game was played. Alternatively, it may take place at a peer terminal or network server on a gaming network. Some relevant methods and devices involving peer-to-peer file transfers between gaming machines are discussed in U.S. patent application Ser. No. 11/173,442 by Kinsley et al., filed Jul. 1, 2005 and entitled "METHODS AND DEVICES FOR DOWNLOADING GAMES OF CHANCE," which is hereby incorporated by reference in its entirety and for all purposes.

Figure 3:
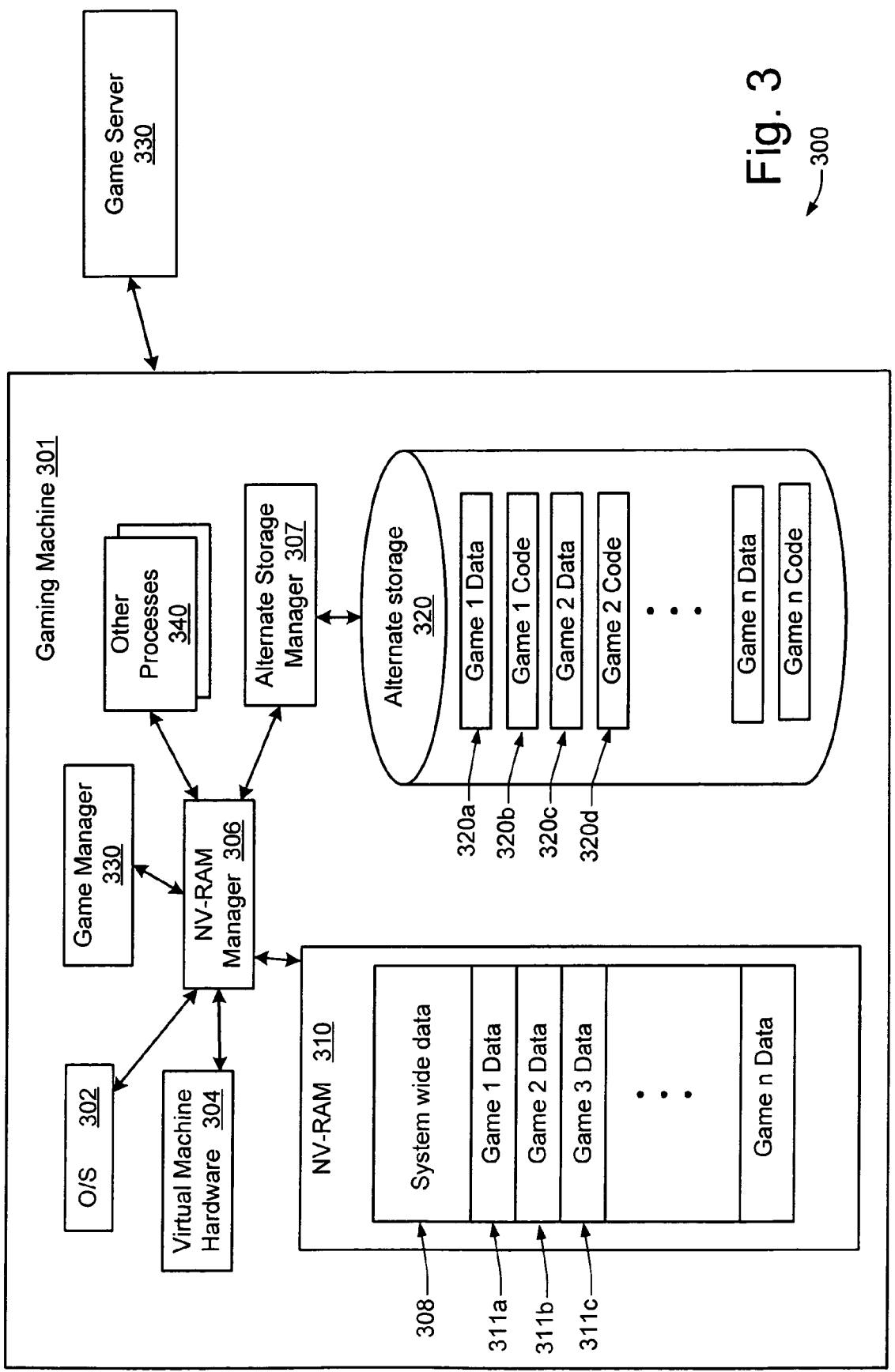
FIG. 3 is a simplified block diagram of a specific embodiment of a gaming system 300 which may be used to illustrate various concepts relating to the present invention.

FIG. 3 is a simplified block diagram of a specific embodiment of a gaming system 300 which may be used to illustrate various concepts relating to the present invention. As illustrated in FIG. 3, gaming system 300 may include a least one gaming machine 301, and optionally one or more gaming servers 330. For purposes of simplification, only a portion of the various components which may comprise the gaming machine at 301 are shown in FIG. 3. For example, as illustrated in FIG. 3, gaming machine 301 may include: an operating system (O/S) 302, Game Manager 330, virtual machine hardware 304, NV-RAM Manager 306, Alternate Storage Manager 307, other processes 340, non-volatile RAM (NV-RAM) 310, Alternate Storage 320, etc. In this example of FIG. 3, the Alternate Storage 320 is configured as non-volatile mass storage which is implemented using one or more disk drives.

As illustrated in the example of FIG. 3, NV-RAM 310 may be used to store a variety of accumulated game information, critical data and/or other types of state information relating to current or past states of the gaming machine. Such information may relate to system-wide (e.g., "global") data (e.g., 308) and/or game specific data (e.g., 311*a*, 311*b*, 311*c*, etc.).

Additionally, as illustrated in the example of FIG. 3, Alternate Storage 320 may also be used to store a variety of gaming information including, for example, permanent game information and/or game code (e.g., 320*b*, 320*d*, etc.); accumulated information (e.g., 320*a*, 320*c*); etc.

According to a specific embodiment, accumulated information may include critical data that is considered to be highly important. For example, accumulated information may include information related to the current or previous state(s) of a gaming machine. Examples of accumulated information include: game history information, security information, accounting information, player tracking information, wide area progressive information, game state information, game usage information, game transactional information, game meter information, bonus of game information, player input information, and/or any "critical" game related data. Accumulated information such as the amount of funds credited to or paid out from a gaming machine may be stored permanently in NV-RAM 310 as accounting information. This critical accounting information would reflect its current and prior states over successive rounds of play. To the casino owner, this information may be important in determining the casino's profitability.

According to a specific embodiment, NV-RAM 310 may be configured or designed to maintain the contents of its memory over time through the use of a battery as a power source, thereby allowing it to be independent of externally supplied power. As a result, NV-RAM can continue to store data such as accumulated information as long as power is supplied. Typically, an NV-RAM contains its own internal battery source.

In at least one embodiment, direct access to the NV-RAM 310 may be restricted to the NV-RAM Manager 306. In such embodiments, other components, modules, and/or processes wishing to access the NV-RAM 310 may achieve such access as a client of the NV-RAM Manager. Possible examples of such NV-RAM Manager clients include operating system (O/S) 302, Game Manager 330, virtual machine hardware 304, Alternate Storage Manager 307, Game Server 330, and/or other process such as, for example: driver processes, peripheral processes, communication processes, configuration processes, tilt processes and/or any other process which may want to preserve data so that it can be recovered after a power hit or system restart. Similarly, in at least one embodiment, direct access to the Alternate Storage 320 may be restricted to the Alternate Storage Manager 307. Alternatively, in a different embodiment, the NV-RAM Manager 306 may be provided with direct access to Alternate Storage 320.

As described in greater detail below, one aspect of the present invention is directed to a mechanism for swapping desired information (e.g., critical information and/or accumulated game information) between the NV-RAM 310 and Alternate Storage 320, as games are added (e.g., allocated) and/or removed (e.g., de-allocated) to/from the gaming machine.

Figure 4:
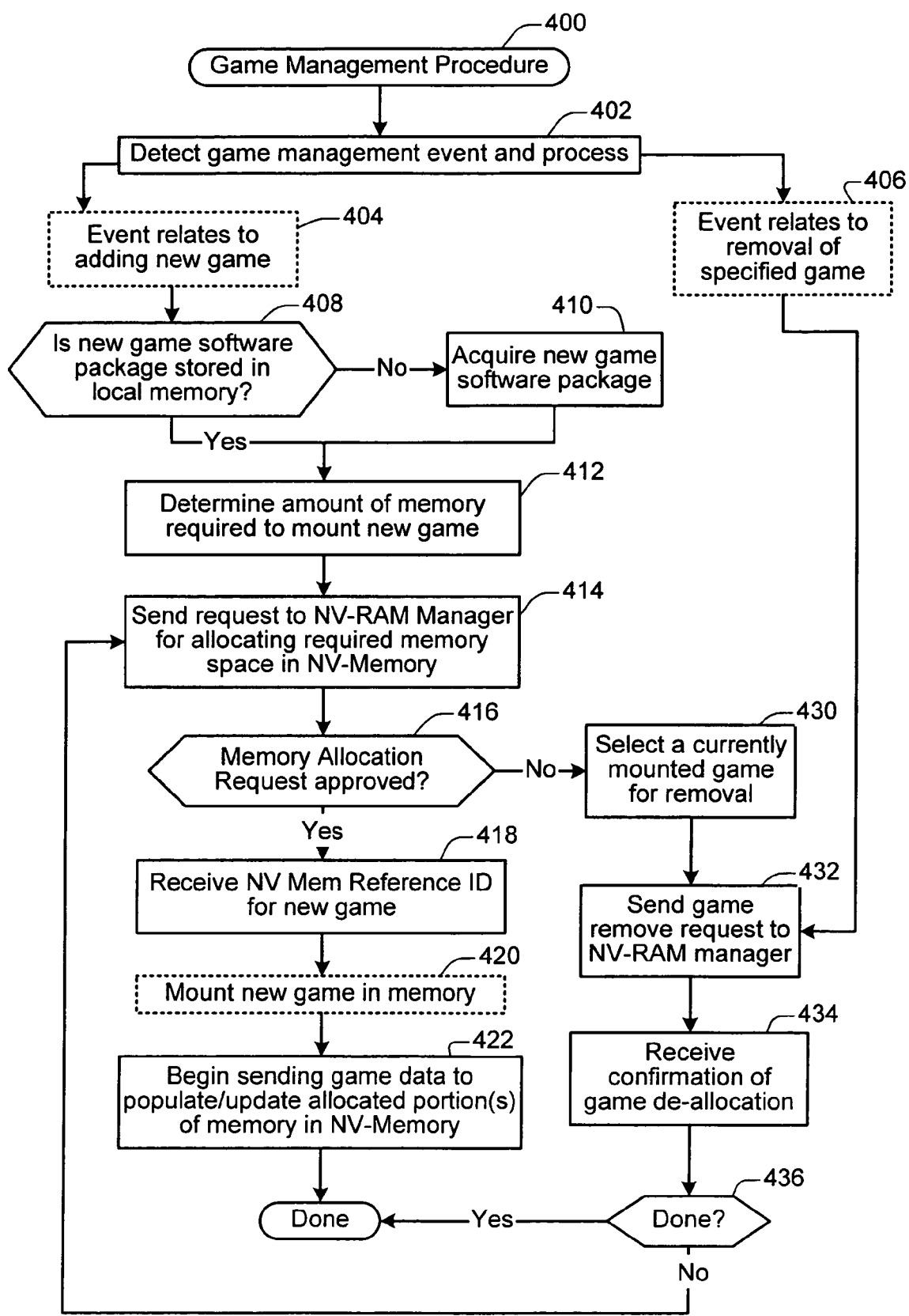
FIG. 4 shows a flow diagram of a Game Management Procedure 400 in accordance with a specific embodiment of the present invention.

FIG. 4 shows a flow diagram of a Game Management Procedure 400 in accordance with a specific embodiment of the present invention. In at least one embodiment, at least a portion of the Game Management Procedure 400 may be implemented by the Game Manager (e.g., 330, FIG. 3) for managing such tasks as: adding a new game at the gaming machine; removing an existing game at the gaming machine; allocating memory space for new games being added to the gaming machine; de-allocating memory space for existing games which are being removed from the gaming machine; etc.

In at least one implementation, the Game Manager may initiate portions of the Game Management Procedure 400 in response to detecting one or more events such as, for example: detection of a new game software package that has been downloaded to the gaming machine; receiving user input (e.g., from player, administrator, casino attendant, etc.) to add/remove specified game(s) to/from the gaming machine; receiving instructions from external components (e.g., external device, remote server, other gaming machine, etc.) to add/remove specified game(s) to/from the gaming machine; etc.

As shown at 402, when a game management event is detected, the Game Management Procedure may process the event in order to determine an appropriate response.

For example, if the detected event relates to a request for removing (406) a specified game that is currently installed at the gaming machine, the Game Management Procedure may respond by sending (432) a game removal request to the NV-RAM Manager, as well as other processes (if desired). Upon receiving a game removal request, the NV-RAM Manager may respond by implementing one or more game removal procedures such as those illustrated, for example, in FIG. 5B and/or FIG. 7 of the drawings. In at least one implementation, the game removal procedure(s) may include unmounting game code from the gaming machine RAM and/or de-allocating memory space (e.g., memory blocks) from the NV-RAM which was allocated for storing accumulated information relating to the game selected for removal. Upon receiving (434) confirmation of the game de-allocation, the Game Management Procedure may determine (436) whether additional operations are to be performed, such as, for example, allocating memory space in the NV-RAM for a new or recently added game. If so, the Game Management Procedure may implement such additional operations, as required.

In situations where the detected game management event relates to a request for adding (404) a new game at the gaming machine, the Game Management Procedure may determine (408) whether the new game software package is stored in local memory. If not, the Game Management Procedure may initiate steps for acquiring (410) the necessary software code and/or other information relating to the new game which is to be added at the gaming machine. As shown at 412, the Game Management Procedure may analyze at least a portion of the acquired information in order to determine the amount of memory which is required to be allocated for adding the new game. For example, the Game Management Procedure may determine or estimate the amount of memory to be allocated in the NV-RAM for the identified game that is to be added. Thereafter, the Game Management Procedure may send (414) a memory allocation request to the NV-RAM Manager to allocate a specified amount of memory space in the non-volatile memory (e.g., NV-RAM) to be used for storing accumulated information and/or other information relating to the new game.

At 416 a determination is made as to whether the memory allocation request has been approved. According to a specific embodiment, if the memory allocation request is not approved, it may be because there is insufficient available memory in the NV-RAM for allocating the requested memory. Accordingly, in one implementation, the Game Management Procedure may identify and select (430) a currently mounted or existing game at the gaming machine for removal/de-allocation, and send (432) a game removal request to the NV-RAM Manager (as well as other processes, if desired) for removing the selected game and related data from the gaming machine memory. Upon receiving a game removal request, the NV-RAM Manager may respond by implementing one or more game removal procedures such as those illustrated, for example, in FIG. 5B and/or FIG. 7 of the drawings. In at least one implementation, the game removal procedure(s) may include unmounting game code from the gaming machine RAM and/or de-allocating memory space (e.g., memory blocks) from the NV-RAM which was allocated for storing accumulated information relating to the game selected for removal. Upon receiving (434) confirmation of the game de-allocation, the Game Management Procedure may determine (436) whether additional operations are to be performed. In the present example, the Game Management Procedure may send (414) another memory allocation request to the NV-RAM Manager to allocate a specified amount of memory space in the NV-RAM to be used for storing accumulated information and/or other information relating to the new game.

Assuming the memory allocation request is approved (416), the Game Management Procedure will receive (418) an NV Memory Reference ID (NVMR ID) for the new game. In at least one implementation, a unique NVMR ID may be assigned for each respective game at the gaming machine, and used, for example, for accessing memory space in the NV-RAM which has been allocated for that specific game.

In addition to allocating memory in the NV-RAM for the new game, game code relating to the new game may be mounted (420) in the gaming machine memory (e.g., RAM).

Thereafter, the Game Manager may begin sending (422) accumulated information and/or other information relating to the new game to the NV-RAM Manager for populating and/or updating the portions of memory in the NV-RAM which have been allocated for the new game. In at least one implementation, the information which is sent to the NV-RAM Manager may include the NVMR ID associated with the new game. Using the NVMR ID, the NV-RAM Manager may correctly identify and determine where the received information should be stored in the NV-RAM and/or other non-volatile storage. Additionally, the NVMR ID may also be used for retrieving or accessing desired information relating to a selected Game from the NV-RAM and/or other non-volatile storage.

Figures 5A, 5B:
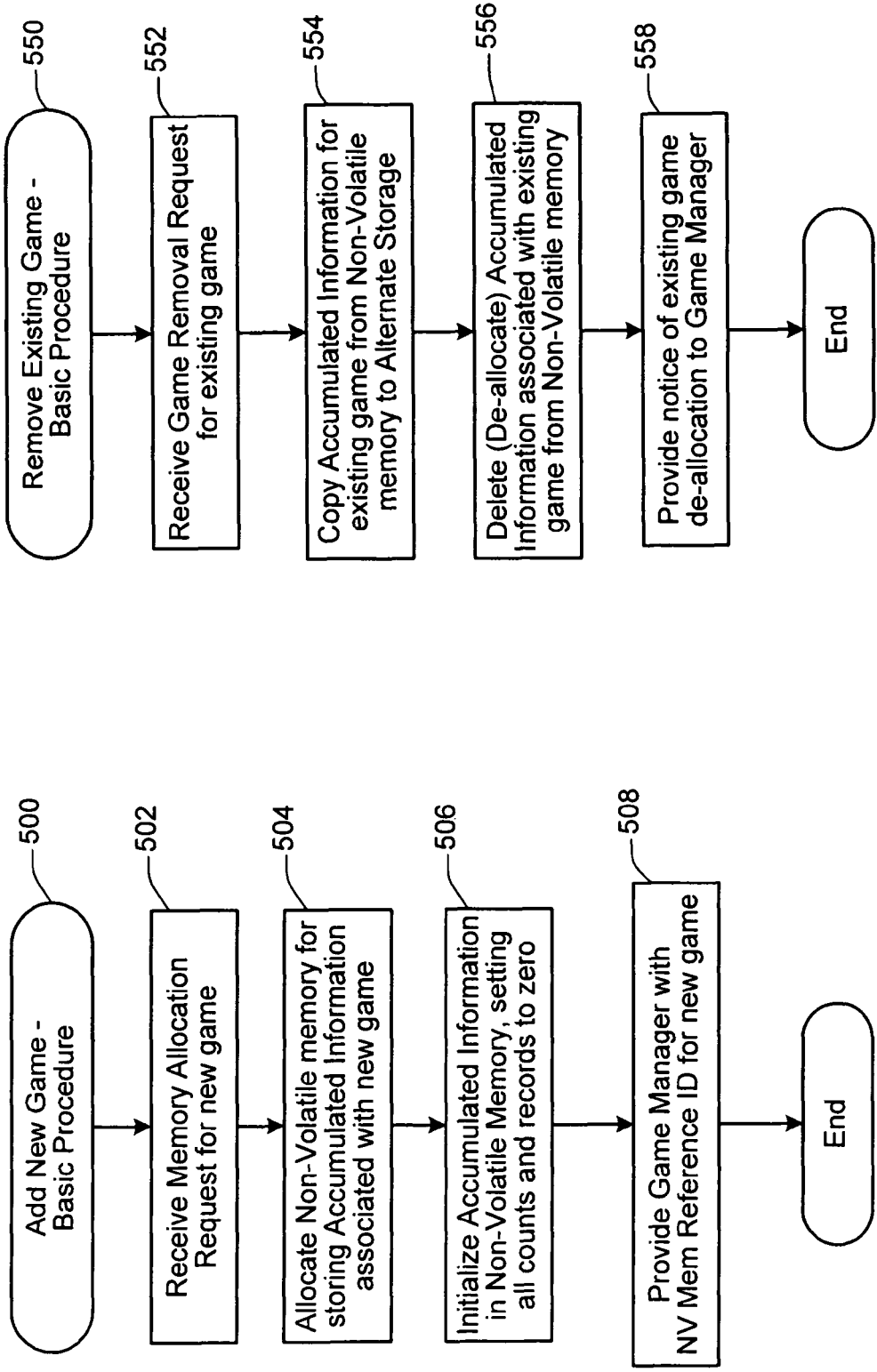
FIGS. 5A and 5B illustrate flow diagrams of various procedures which may be implemented for adding or removing games at a gaming machine, in accordance with the specific embodiment of the present invention.

FIGS. 5A and 5B illustrate flow diagrams of various procedures which may be implemented for adding or removing games at a gaming machine, in accordance with the specific embodiment of the present invention. In at least one implementation, at least a portion of the procedures illustrated in FIGS. 5A, 5B may be implemented by the NV-RAM Manager.

FIG. 5A shows a simplified embodiment of an Add New Game Procedure 500, which may be implemented when adding, mounting, and/or activating a new game at the gaming machine. In at least one embodiment, the Add New Game Procedure 500 may be invoked when a memory allocation request is received at the NV-RAM Manager. Such a request may be generated by the Game Manager as illustrated, for example, at 414 of FIG. 4.

As illustrated in FIG. 5A, when a memory allocation request for a new game is received (502), the NV-RAM Manager may respond by allocating (504) non-volatile memory (e.g., blocks of memory in NV-RAM) for storing accumulated information associated with the new game. The accumulated information in the NV-RAM may then be initialized (506), for example, by setting all counts and records to zero. Additionally, the NV-RAM Manager may assign a Non-Volatile Memory Reference ID (NVMR ID) for the new game and provide (508) the NVMR ID to the Game Manager.

FIG. 5B shows a simplified embodiment of a Remove Existing Game Procedure 550, which may implemented when removing, unmounting, and/or deactivating an existing game from the gaming machine. In at least one embodiment, the Remove Existing Game Procedure 550 may be invoked when a game removal request is received at the NV-RAM Manager. Such a request may be generated by the Game Manager as illustrated, for example, at 432 of FIG. 4.

As illustrated in FIG. 5B, when a game removal request for an existing game is received (552), the NV-RAM Manager may respond by copying (554) accumulated information relating to the existing game from the NV-RAM to Alternate Storage (e.g., 320, FIG. 3). This feature of swapping of accumulated information from the NV-RAM to Alternate Storage represents a novel concept which is not available in any conventional gaming system. After the appropriate information/data has been moved from the NV-RAM to the Alternate Storage, the NV-RAM Manager may then delete and/or de-allocate the memory space in the NV-RAM which has been allocated for storing accumulated information relating to the existing game that is targeted for removal. Various techniques which may be used for de-allocating appropriate space in the non-volatile memory are described, for example, in U.S. patent application Ser. No. 10/243,104, filed Sep. 13, 2002, and titled DYNAMIC NV-RAM, by Nelson et al., previously incorporated by reference. Upon successfully de-allocating the appropriate memory space from the NV-RAM, the NV-RAM Manager may then provide (558) notification to the Game Manager, confirming de-allocation of the existing game accumulated information from the NV-RAM. Additionally, in at least one implementation, portions of game code relating to the existing game may be removed or unmounted from the gaming machine RAM.

Figure 6:
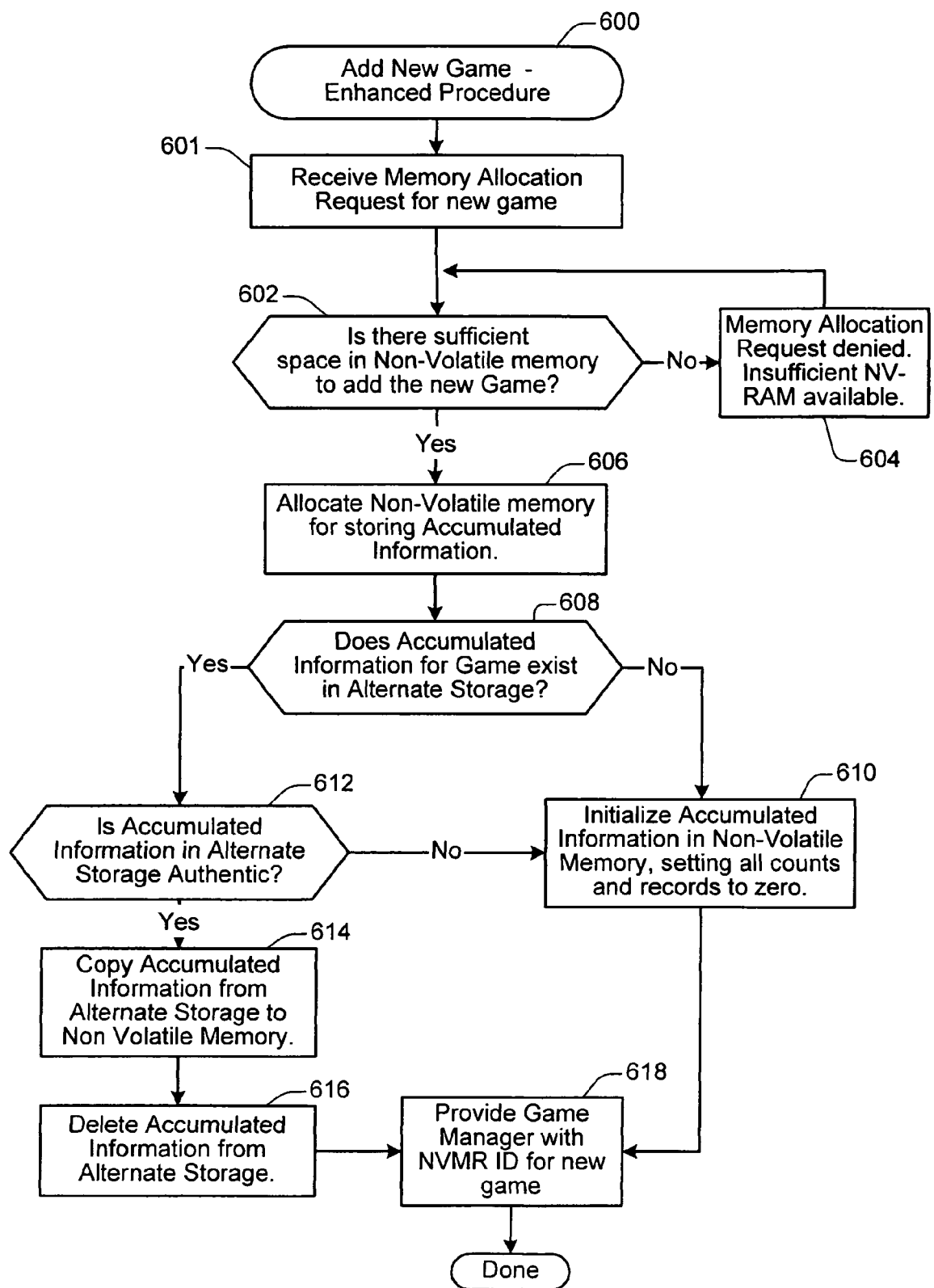
FIG. 6 shows an alternate embodiment of an Add New Game Procedure 600.

FIG. 6 shows an alternate embodiment of an Add New Game Procedure 600, which may be implemented when adding, mounting, and/or activating a new game at the gaming machine. In at least one embodiment, the Add New Game Procedure 600 may be invoked when a Memory Allocation Request is received at the NV-RAM Manager. Such a request may be generated, for example, by the Game Manager as illustrated, for example, at 414 of FIG. 4. According to different embodiments, portions of the Add New Game Procedure 600 may be implemented by the Game Manager, NV-RAM Manager and/or Alternate Storage Manager.

As illustrated in FIG. 6, when a Memory Allocation Request relating to a new game is received (601), the NV-RAM Manager may analyze the Memory Allocation Request in order to determine the amount of memory to be allocated for the new game. Using this information, a determination may then be made (602) as to whether there is sufficient space in the non-volatile memory (e.g., NV-RAM) for allocating the requested memory space relating to the new game. If there is not sufficient memory space available, a response may be generated (604) which indicates that the Memory Allocation Request has been denied. Additional information may optionally be included relating to the reason for the denial such as, for example, insufficient NV-RAM available. As described previously with respect to FIG. 4, the game manager may respond to the denied Memory Allocation Request by selecting at least one existing game at the gaming machine for removal/de-allocation. Thus, for example, by removing or de-allocating a currently allocated block of memory relating to an existing game, allocation of the requested memory block(s) for the new game may be accommodated.

As illustrated in the example of FIG. 6, if it is determined that there is sufficient space available in the NV-RAM for allocating the requested memory space relating to the new game, the requested memory space may be allocated (606) in the NV-RAM for storing accumulated information relating to the new game.

As shown at 608, a determination is made as to whether any accumulated information relating to the new game exists in the Alternate Storage. For example, it may be possible that the new game had been previously installed at the gaming machine (and then removed), and that accumulated information relating to that game had been stored in the Alternate Storage prior to de-allocating the game from the gaming machine.

If it is determined that accumulated information relating to the new game does not exist in the Alternate Storage (and/or other non-volatile memory devices), the NV-RAM Manager may respond by initializing (610) the accumulated information in the newly allocated memory space of the NV-RAM, such as, for example, by setting all counts and/or records to zero. In at least one implementation, the NV-RAM Manager may also assign an NVMR ID for the new game, and provide (618) the new game NVMR ID to the Game Manager for subsequent use.

Alternatively, if it is determined that accumulated information relating to the new game does exist in the Alternate Storage (and/or other non-volatile memory devices), the identified accumulated information may be analyzed (612) for verification and/or authentication. For example, in one implementation, the authenticator (e.g., 244) may authenticate the identified accumulated information, for example, by performing a CRC check, and/or other authentication procedures. Additional information relating to various authentication and/or verification procedures are described in U.S. patent application Ser. No. 11/221,314, filed Sep. 6, 2005, and titled DATA PATTERN VERIFICATION IN A GAMING MACHINE ENVIRONMENT, by Cockerille et al., which is hereby incorporated by reference in its entirety for all purposes.

If the identified accumulated information cannot be properly validated and/or authenticated, the NV-RAM Manager may respond by initializing (610) the accumulated information in the newly allocated memory space of the NV-RAM. If, however, the identified accumulated information is properly validated and/or authenticated, the identified accumulated information may then be moved or copied (614) from the Alternate Storage to the newly allocated memory space of the NV-RAM, after which the identified accumulated information may be deleted (616) from the Alternate Storage (if desired). In at least one implementation, the NV-RAM Manager may also assign an NVMR ID for the new game, and provide (618) the new game NVMR ID to the Game Manager.

Figure 7:
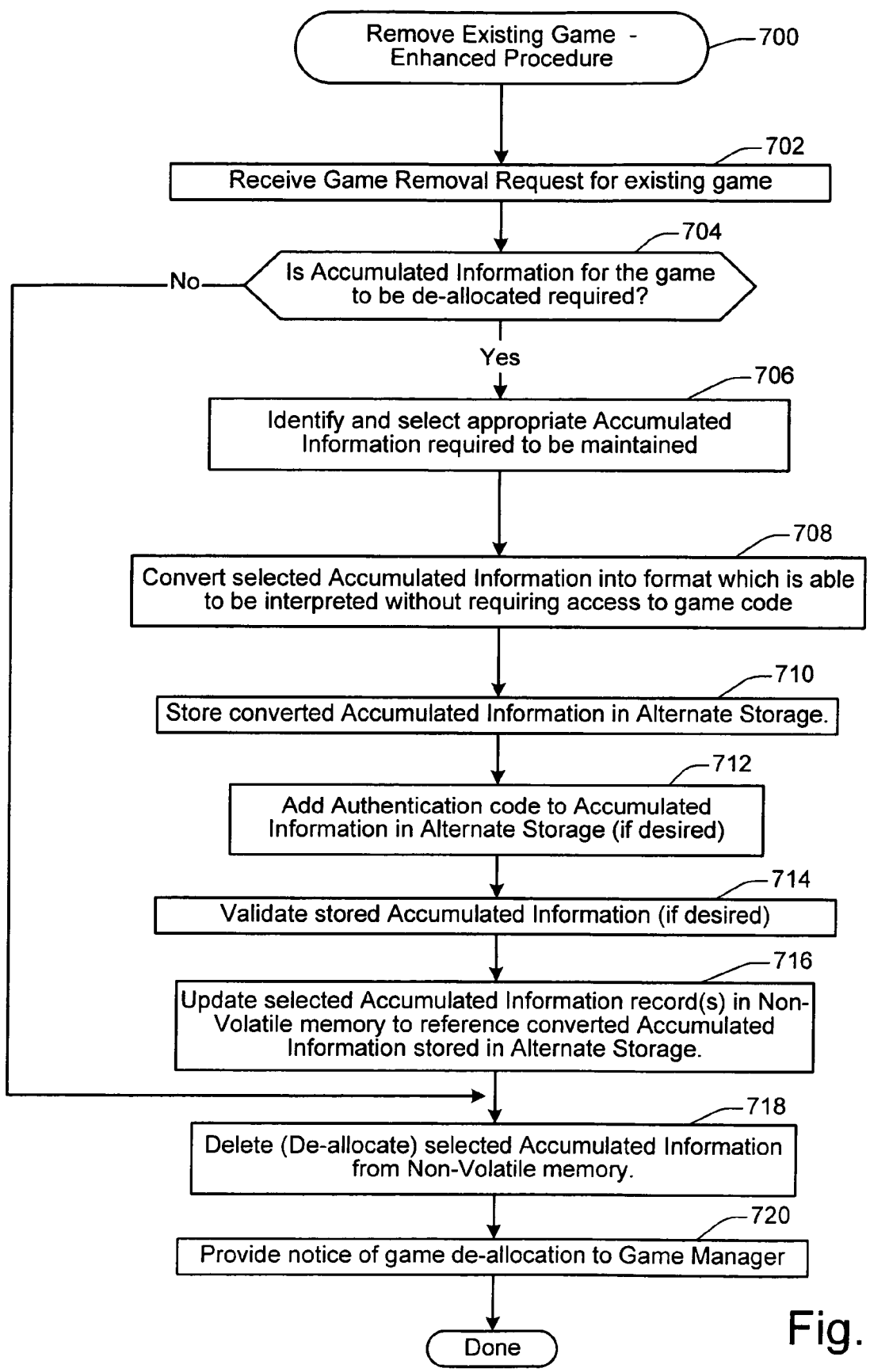
FIG. 7 shows an alternate embodiment of an Remove Existing Game Procedure 700.

FIG. 7 shows an alternate embodiment of an Remove Existing Game Procedure 700, which may be implemented when removing, unmounting, and/or deactivating an existing game from the gaming machine, and/or when de-allocating memory space in the non-volatile memory which was allocated for storing information (e.g., accumulated information) relating to the existing game. In at least one embodiment, the Remove Existing Game Procedure 600 may be invoked when a Game Removal Request is received at the NV-RAM Manager. Such a request may be generated, for example, by the Game Manager as illustrated, for example, at 432 of FIG. 4. According to different embodiments, portions of the Remove Existing Game Procedure 700 may be implemented by the Game Manager, NV-RAM Manager and/or Alternate Storage Manager.

As illustrated in FIG. 7, when a Game Removal Request relating to an existing game is received (702), the NV-RAM Manager may analyze the Game Removal Request in order to determine the identity of the game to be removed from the gaming machine. In at least one implementation, the Game Removal Request may include the NVMR ID associated with the game to be removed. The NV-RAM Manager may use the NVMR ID to identify the non-volatile memory address location(s) which have been allocated for that particular game. In one implementation, this may be accomplished via the use of a Non-volatile Memory Address Table such as that illustrated, for example, in FIG. 11 (described greater detail below).

As shown at 704, a determination may be made as to whether any portion of the identified accumulated information (relating to the existing game which is to be removed/de-allocated) is required to be stored or saved. For example, the regulatory requirements in at least one gaming jurisdiction may specify that accumulated information relating to the last 10 games played at the gaming machine is to be preserved. In this example, if the game to be removed was played at least once during the last 10 games played at the gaming machine, accumulated information relating to those specific games must be stored, at least temporarily, at the NV-RAM or Alternate Storage of the gaming machine. Accordingly, as shown at 706, the NV-RAM Manager may identify and select the appropriate accumulated information that is required to be maintained. Additionally, the NV-RAM Manager may determine and keep track of how long each portion of accumulated information is to be maintained in the non-volatile memory and/or Alternate Storage. Thus, for example, if it is assumed for purposes of illustration that the game targeted for removal was played on two occasions (e.g., game 4 and game 6) during the last 10 games played at the gaming machine, then the accumulated information relating to games 4 and 6 may be required to be preserved in the non-volatile memory/Alternate Storage.

If it is determined that there is no need or requirement for storing any accumulated information relating to the game to be removed, the identified accumulated information may be deleted (718) from the non-volatile memory and/or from Alternate Storage, if desired. In one implementation, the deleting of the accumulated information may be accomplished by de-allocating the non-volatile memory blocks associated with the game to be removed. Additionally, if desired, portions of game code relating to the game to be removed may be deleted or unmounted from the gaming machine RAM. Thereafter, notice of the successful completion of the game de-allocation may be provided (720) to the Game Manager.

In conventional gaming systems, accumulated information which is saved in the non-volatile memory of the gaming machine typically relates to existing game(s) which are concurrently mounted in the gaming machine RAM. Because the game code for such existing games is readily accessible and available at the gaming machine, it has been the conventional practice to minimize the amount of accumulated information to be stored by allowing such accumulated information to be stored in a format which requires access to the game code for proper interpretation and/or reconstruction. For example, using conventional techniques, if accumulated information relating to a video poker game is to be stored in the NV-RAM, such accumulated information may typically include alphanumeric text information relating to the amount wagered, payout amount, cards dealt, etc. However, the accumulated information would typically not include images, screen shots, or other information which could readily be produced by accessing desired portions of the game code. In such conventional gaming machines, if a casino attendant were to request a game history review of the video poker game, the Game Manager may generate screen shots of the video poker game history using information from the stored accumulated information in combination with information obtained from the video poker game code.

However, in contrast to conventional techniques in which the game code has typically always been available for access and the use in generating and displaying historical game data, at least one embodiment of the present invention may be configured or designed to take into account the fact that one or more existing games at the gaming machine may be removed from the gaming machine (which, for example, may include removing or unmounting game code from the gaming machine RAM). In such situations, desired game code may not be available for access. Accordingly, in at least one implementation of the present invention, selected portions of accumulated information may be converted (708) into a format which is able to be interpreted and/or displayed without requiring access to the game code and/or other information which may be deleted as a result of one or more games being removed from the gaming machine.

Thus, for example, referring to the example of FIG. 7, at least a portion of the accumulated information (relating to the game targeted for removal) which was identified at 706 may be converted (708) into a format which is able to be interpreted and/or displayed without requiring access to the corresponding game code. According to specific embodiments, such converted accumulated information may include, for example, text descriptions, images, screen shots, etc., and may relate to a variety of different types of information such as, for example, game history information, accounting information, progressive information, license information, etc.

As shown at 710, the converted accumulated information may be stored at selected memory locations of the Alternate Storage. If desired, authentication information may be added (712) to the accumulated information that is stored in the Alternate Storage. In at least one implementation, the authentication information may include, for example: CRC information, Hash code information, encrypted signature information and/or other types of information and/or security features which allow the stored accumulated information to be properly validated and/or authenticated.

Additionally, if desired, the accumulated information which is stored at the alternate storage may be authenticated and/or validated (714), for example, using one or more conventional data authentication and/or validation techniques. The NV-RAM Manager may also update (716) selected Accumulated Information Record(s) (e.g., those relating to the converted accumulated information) in the NV-RAM to reference the associated converted accumulated information stored in the Alternate Storage. For example, the appropriate records in the NV-RAM may be updated to include pointer or reference information which points (or refers) to memory address location(s) in the Alternate Storage where the actual accumulated information is stored. An example of this feature is illustrated and described in greater detail with respect to FIG. 10 of the drawings.

After the appropriate accumulated information has been stored at the Alternate Storage, the identified accumulated information (relating to the game to be removed) may be deleted (718) from the NV-RAM. In one implementation, the deleting of the accumulated information may be accomplished by de-allocating the non-volatile memory blocks associated with that game. Additionally, if desired, portions of game code relating to the game to be removed may be deleted or unmounted from the gaming machine RAM. Thereafter, notice of the successful completion of the game de-allocation may be provided (720) to the Game Manager.

According to specific embodiments, different algorithms may be used for determining which information should be stored in NV-RAM and which information should be stored in Alternate Storage. For example, in one implementation where NV-RAM storage is more costly per byte than mass storage (e.g., Alternate Storage), information stored in the NV-RAM may be analyzed in order to determine a relative priority of importance of the information stored therein. Examples of factors for prioritization may include: when the information was last accessed (e.g., least recently used information gets lower priority); space required for storing the information; predefined priorities for different types of information; etc. In one implementation, information stored in the NV-RAM which is considered to be of relatively low priority may be moved to the Alternate Storage and/or transferred in/out of the NV-RAM as the needed.

Figure 10:
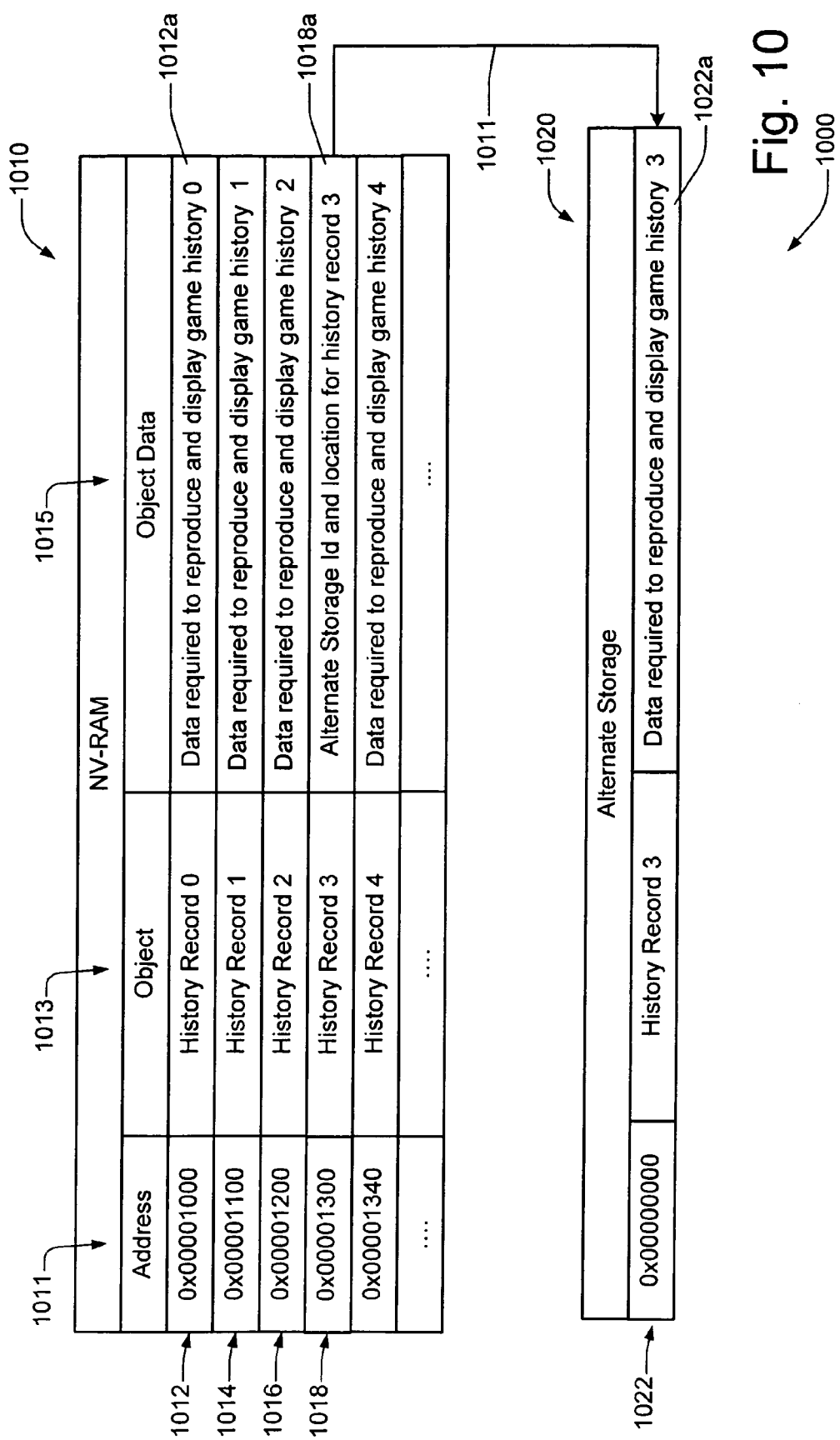
FIG. 10 shows an example of a portion 1000 of gaming machine memory which includes non-volatile memory portion 1010, and Alternate Storage memory portion 1020.

FIG. 10 shows an example of a portion 1000 of gaming machine memory which includes non-volatile memory portion 1010, and Alternate Storage memory portion 1020. In the example of FIG. 10 it is assumed that non-volatile memory portion 1010 is implemented using NV-RAM.

It will be appreciated that the data structures illustrated in FIG. 10 are intended to illustrate by way of example various aspects of the present invention relating to the storage and access of accumulated information at the NV-RAM and/or Alternate Storage. For example, as illustrated in FIG. 10, NV-RAM portion 1010 includes a plurality of memory blocks (e.g., 1012, 1014, 1016, 1018, etc.), each of which being specifically allocated for storing object information (e.g., game history data) relating to a specific portion of accumulated information. Thus, for example, as illustrated at 1012 of FIG. 10, a first portion of NV-RAM beginning at memory address 0x00001000 has been allocated for storing object data (1015) relating to Game History Record 0. In this example, the object data (e.g., 1012*a*) includes data which may be required to reproduce and display game history 0 relating to a specific game. Similarly, as illustrated at 1014 of FIG. 10, a second portion of NV-RAM beginning at memory address 0x00001100 has been allocated for storing object data relating to Game History Record 1. In this example, the object data (1015) stored at the NV-RAM includes data which may be required to reproduce and display game history 1 relating to a specific game.

In contrast, as illustrated at 1018 of FIG. 10, a third portion of NV-RAM beginning at memory address 0x00001300 has been allocated for storing information relating to Game History Record 3. However, in this example, it is assumed that the object data relating to Game History Record 3 has been a removed from the NV-RAM and stored in the Alternate Storage. Accordingly, the information stored in the object data portion (1018*a*) of memory portion 1018 includes information specifying the memory location in Alternate Storage where the actual object data relating to Game History Record 3 is stored. Such information may include, for example: Alternate Storage identifier information (e.g., if more than one Alternate Storage device is used); memory address information (e.g., pointer or link) for identifying the memory location(s) in the Alternate Storage where the desired object data may be located; etc.

In the example of FIG. 10, it is assumed that the object data relating to Game History Record 3 is stored at Alternate Storage portion 1020 in an allocated portion (1022) of memory beginning memory address 0x00000000. Accordingly, the information stored in the object data portion 1018*a* of allocated NV-RAM memory portion 1018 may include a pointer to Alternate Storage memory address 0x00000000.

FIG. 11 shows and exemplary portion of a Non-Volatile Memory Address Mapping Table 1100 in accordance with a specific embodiment of the present invention. In at least one implementation, the Non-Volatile Memory Address Mapping Table of FIG. 11 may be used to determine the memory location of an allocated portion of nonvolatile memory corresponding to a specified NV Memory Reference ID (NVRM ID). As illustrated in the example of FIG. 11, each record (e.g., 1112, 1114, 1116, 1118, etc.) in the Non-Volatile Memory Address Mapping Table may comprise a plurality of fields relating to different types of information associated with that record such as, for example:
  NVMR ID field 1102. This field may be used as a key for looking up other information relating to the record.
  NV Memory Address Pointer field 1104. In the example of FIG. 11, this field includes a memory address corresponding to a starting memory location of the non-volatile memory space which has been allocated for the associated NVMR ID.
  Allocation Size field 1106. In the example of FIG. 11, this field includes a value relating to the size of memory space (e.g., HEX bytes) which has been allocated for the associated NVMR ID.

It will be appreciated that one of the advantages of the accumulated information storage technique of the present invention is that, by storing the actual object data at the Alternate Storage rather than at the NV-RAM, less memory is required to be allocated in the NV-RAM for that particular object since, for example, the object data portion of the object (in NV-RAM) need only include Alternate Storage pointer information for accessing the actual object data stored in Alternate Storage. Thus, for example, as shown in the illustrative examples of FIGS. 10 and 11, a memory block size of 0x100 (HEX Bytes) may be allocated for storing in the NV-RAM accumulated information (e.g., 1012*a*) relating to a particular object (e.g., 1013); whereas a memory block size of only 0x040 (HEX Bytes) may be allocated for storing, in the NV-RAM, Alternate Storage pointer information (e.g., 1018*a*) for accessing the associated object data stored in Alternate Storage.

Although the examples of FIGS. 10 and 11 are described with respect to storing and accessing game history data, it will be appreciated that the technique of the present invention may also be used for managing, storing and/or accessing other types of accumulated information/information such as, for example: game history information, security information, accounting information, player tracking information, wide area progressive information, game state information, game usage information, game transactional information, game meter information, bonus of game information, player input information, license information, and/or any "critical" game related data.

Figure 8:
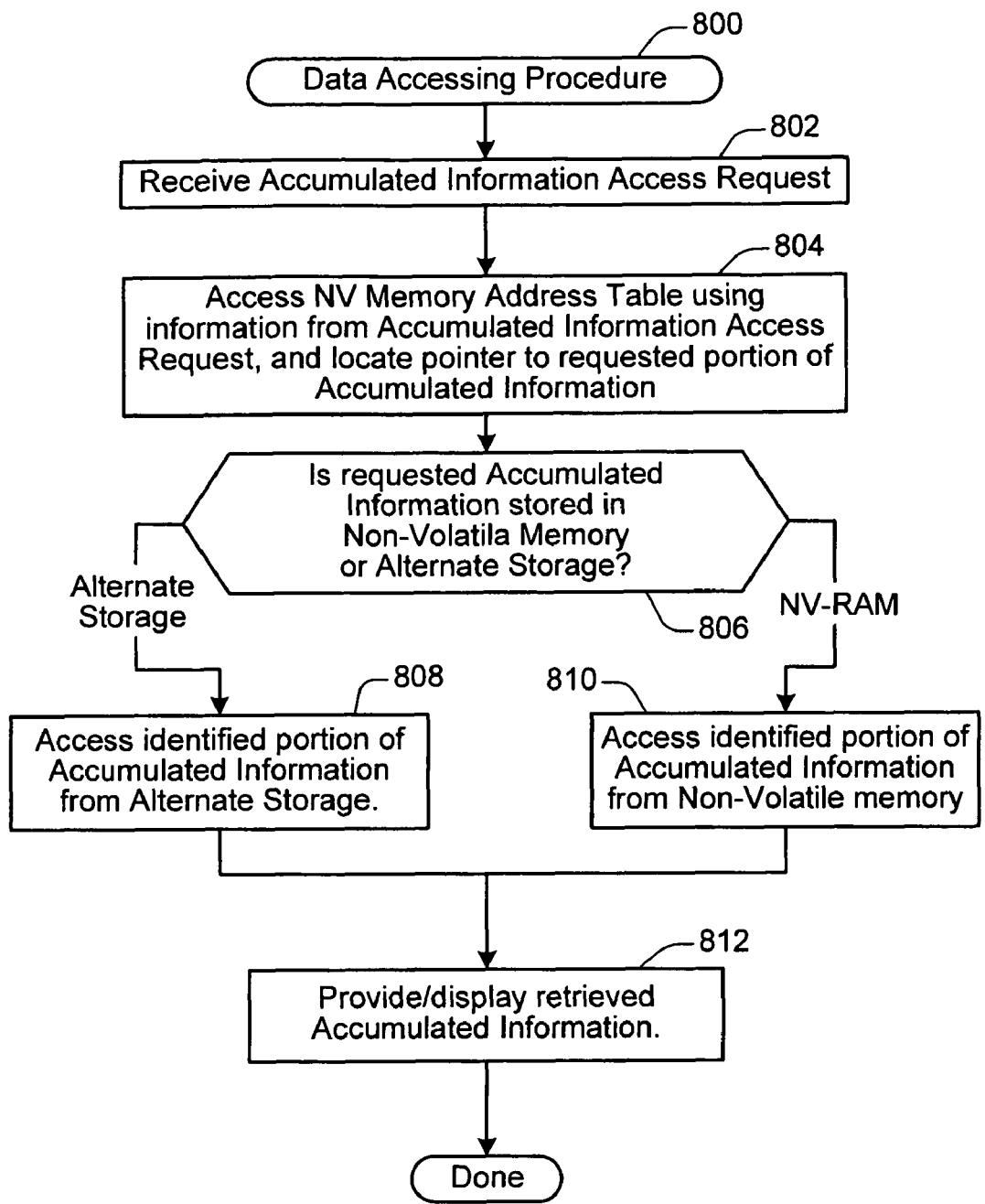
FIG. 8 shows a flow diagram of a Data Accessing Procedure 800 in accordance with a specific embodiment of the present invention.

FIG. 8 shows a flow diagram of a Data Accessing Procedure 800 in accordance with a specific embodiment of the present invention. According to specific embodiments, desired game data and/or other accumulated information may be accessed via the Game Manager and NV-RAM Manager. The accessing of accumulated information may include, for example, reading accumulated information and/or writing accumulated information from/to the NV-RAM and/or Alternate Storage. In one implementation, the Game Manager may be configured or designed to manage the reading/writing of game data and/or other accumulated information to the NV-RAM during game play. In the example of FIG. 8, portions of the Data Accessing Procedure 800 may be implemented by the NV-RAM Manager in response to a variety of event such as, for example, request from the Game Manager, actions performed by the gaming machine operator/attendant, request from remote servers, etc.

As shown in the example of FIG. 8, it is assumed at 802 that the NV-RAM Manager receives a request for accessing (e.g., reading) a desired portion of accumulated information from the non-volatile memory (e.g. NV-RAM). In at least one implementation, such a request may be generated and submitted by the Game Manager, and may include various request parameters such as, for example: NVMR ID, information relating to the type of accumulated information to be accessed (e.g., game history, accounting, license, etc.), information relating to the specific record(s) to be accessed, etc. Using at least a portion of the information from the accumulated information access request, a memory address mapping table may be accessed (804) in order to identify or locate one or more pointer(s) to the requested portion(s) of accumulated information. In at least one implementation, a pointer may correspond to a starting memory address of a desired memory location. In at least one implementation, the information stored at the memory address mapping table may be used to determine whether the desired accumulated information is stored, for example, at the NV-RAM, or at the Alternate Storage. An example of a memory address mapping table is illustrated in FIG. 11.

At 806 a determination is made as to whether the requested accumulated information is stored in non-volatile memory (e.g. NV-RAM) or Alternate Storage. For example, referring to FIGS. 10 and 11, if the accumulated information access request corresponds to a request for accessing game history data relating to NVMR ID 0, a lookup may be performed at the Non-Volatile Memory Address Mapping Table of FIG. 11 for identifying the memory space in the NV-RAM which has been allocated for NVMR ID 0. In this example, such a lookup operation may indicate that a memory block size of 0x100 (HEX Bytes) is currently allocated in the NV-RAM for NVMR ID 0, starting at NV-RAM memory address 0x00001000. The identified memory block in the NV-RAM may then be accessed in order to determine whether the corresponding object data portion (e.g., 1012*a*) includes the actual object data, or includes Alternate Storage pointer information. Since, in the example of FIG. 10, the identified object data portion (1012*a*) includes actual data, it may be determined (806) that requested accumulated information is stored in the NV-RAM.

Alternatively, if the accumulated information access request corresponds to a request for accessing game history data relating to NVMR ID 3, a lookup may be performed at the Non-Volatile Memory Address Mapping Table of FIG. 11 for identifying the memory space in the NV-RAM which has been allocated for NVMR ID 3. In this example, such a lookup operation may indicate that a memory block size of 0x040 (HEX Bytes) is currently allocated in the NV-RAM for NVMR ID 3, starting at NV-RAM memory address 0x00001300. The identified memory block in the NV-RAM may then be accessed in order to determine whether the corresponding object data portion (e.g., 1018*a*) includes the actual object data or Alternate Storage pointer information. Since, in the example of FIG. 10, the identified object data portion (1018*a*) includes Alternate Storage pointer information, it may be determined (806) that requested accumulated information is stored in the Alternate Storage.

Returning to FIG. 8, if it is determined that the requested accumulated information is stored in Alternate Storage, the requested accumulated information may be accessed (808) at the specified Alternate Storage memory location(s) using the Alternate Storage pointer information stored in the NV-RAM. If, however, it is determined that the requested accumulated information is stored in NV-RAM, the requested accumulated information may be accessed (810) at the NV-RAM. Thereafter, if desired, the retrieved accumulated information may be provided (812) to the requesting entity and/or rendered for display.

In at least one implementation, the NV-RAM Manager may be configured or designed to include intelligence for: (1) determining the actual location where specified accumulated information is stored (e.g., either in NV-RAM or in Alternate Storage); and (2) automatically taking appropriate action for accessing the specified accumulated information. Thus, for example, if the Game Manager submits a request to the NV-RAM Manager for accessing desired accumulated information from the NV-RAM, the NV-RAM Manager may first determine whether the desired accumulated information is currently stored at the NV-RAM or at the Alternate Storage. If it is determined that the desired accumulated information is stored at the Alternate Storage, the NV-RAM Manager may automatically submit a request to the Alternate Storage Manager to access the desired accumulated information stored therein. In this way, the mechanism for determining and accessing the actual memory location(s) where the accumulated information is stored remains transparent to the requesting client (e.g., Game Manager).

In an alternate embodiment, the Game Manager may be configured or designed to include intelligence for: (1) determining the actual location where specified accumulated information is stored (e.g., either in NV-RAM or in Alternate Storage); and (2) automatically taking appropriate action for accessing the specified accumulated information, for example, by requesting the desired accumulated information from either the NV-RAM Manager (if it is determined that the desired accumulated information is stored in the NV-RAM) or Alternate Storage Manager (if it is determined that the desired accumulated information is stored in the Alternate Storage.

Figure 9:
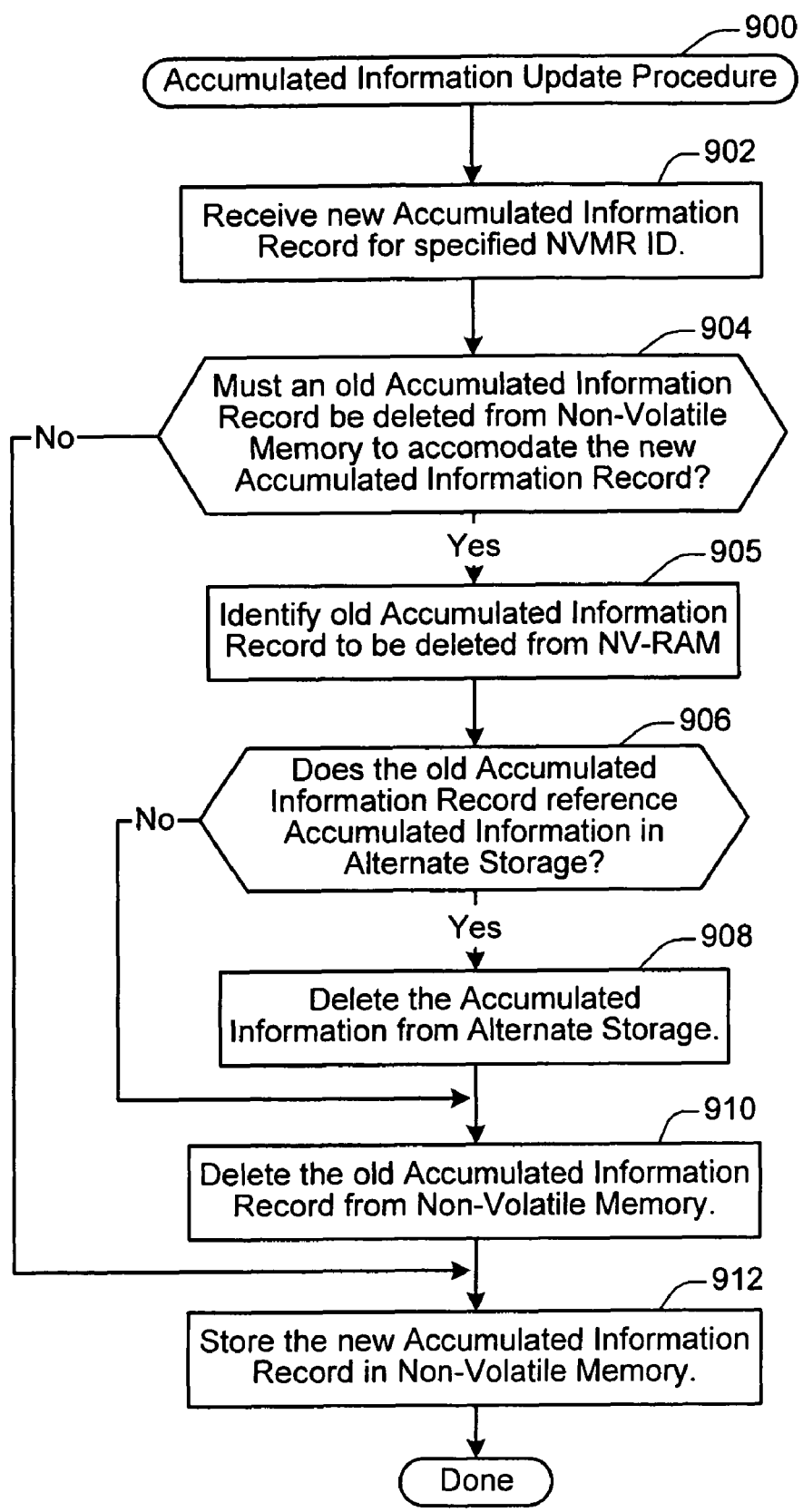
FIG. 9 shows a flow diagram of a Accumulated Information Update Procedure 900 in accordance with a specific embodiment of the present invention.

FIG. 9 shows a flow diagram of a Accumulated Information Update Procedure 900 in accordance with a specific embodiment of the present invention. In at least one implementation, at least a portion of the Accumulated Information Update Procedure 900 may be implemented by the NV-RAM Manager for managing updated accumulated information that is to be stored in the non-volatile memory.

At 902 it is assumed that the NV-RAM Manager receives a new or updated Accumulated Information Record associated with a specific NVMR ID. In at least one implementation, the received Accumulated Information Record may have been generated by the Game Manager. For example, in one embodiment, the Accumulated Information Record may correspond to a new Game Data Record generated by the Game Manager. According to specific embodiments some types of accumulated information (such as, for example, game history data) may be stored and managed in the NV-RAM using a queue type data structure having a limited amount of memory space. Accordingly, in one embodiment, when the queue is full, it may be necessary to remove or overwrite an existing record in the queue in order to be able to add a new or updated data record to the queue.

Thus, as shown in the example of FIG. 9, when a new Accumulated Information Record is received, a determination may be made (904) as to whether it is necessary (or desirable) to delete an old Accumulated Information Record from the NV-RAM in order to accommodate storage of the new Accumulated Information Record in the NV-RAM. In one implementation, if it is determined that it is not necessary to delete an old Accumulated Information Record from the NV-RAM in order to accommodate storage of the new Accumulated Information Record, the new Accumulated Information Record may be stored (912) at an appropriate location in the NV-RAM.

If, however, it is determined that it is necessary (or desirable) to delete an old Accumulated Information Record from the NV-RAM before storing the new Accumulated Information Record in the NV-RAM, an old Accumulated Information Record may be selected (905) for deletion. In one implementation, the selected Accumulated Information Record to be deleted may correspond to the relatively oldest Accumulated Information Record for a given class of objects (e.g., Game History Objects) stored in the NV-RAM. A determination may then be made (906) as to whether the identified old Accumulated Information Record in NV-RAM references information (e.g., accumulated information) stored in Alternate Storage. If so, the referenced information identified in the Alternate Storage may be deleted (908). Thereafter, the identified old Accumulated Information Record may be deleted (910) from the NV-RAM, and the new Accumulated Information Record may be stored (912) in the NV-RAM.

According to specific embodiments, the technique of the present invention may be implemented to include one or more of the following features:

When a new game is to be added at the gaming machine (or a new block of NV-RAM is to be allocated), an existing block of NV-RAM may be removed/de-allocated to accommodate allocating the new block of NV-RAM relating to the new game to be added.

When an existing game is removed from the gaming machine (or when an existing block of NV-RAM is to be de-allocated), accumulated information relating to the existing game which is stored in the NV-RAM may be copied to an Alternate Storage (e.g. hard drive). In one implementation, the NV-RAM may be updated to include a reference to the data stored in Alternate Storage.

When attempting to access desired accumulated information at the gaming machine, the NV-RAM may first be accessed to determine where the desired information is currently stored (e.g., in NV-RAM or in Alternate Storage).

In at least one embodiment, the gaming machines of the present invention may be configured or designed to be state-based systems. In one embodiment of a state-based system, the system is adapted to identify, store and maintain its relevant state information in non-volatile memory, such that, in the event of a power failure or other malfunction, the gaming machine is able to return to its current state when the power is restored. For example, if a player was shown an award for a game of chance and, before the award could be provided to the player the power failed, the gaming machine, upon the restoration of power, may be configured or designed to return to the state where the award is indicated.

According to a specific embodiment, in the event of a power loss at the gaming machine, the NV-RAM Manager may check the current operation information stored in the NV-RAM to determine whether an operation was in progress when the power was lost to the gaming machine. When an operation was not in progress, for instance as a result of a planned shutdown of the gaming machine, the NV-RAM manager may begin accepting requests for operation (e.g. function requests) from clients. However, when the current operation information stored in the NV-RAM indicates that an operation was in progress, the NV-RAM Manager determines whether the operation may be completed. If the operation may be completed, the NV-RAM Manager completes the operation. For instance, if the NV-RAM manager was in the process of re-naming a file but the power was lost prior to completion of the operation, the NV-RAM manager may rename the file to complete the operation. If it is determined that the operation may not be completed, the NV-RAM manager may "roll back" the operation to thereby return the NV-RAM to a valid state prior to the execution of the operation was being performed when the power failure occurred. After the operations stored in the NV-RAM are either executed or "rolled back", the NV-RAM Manager may begin accepting requests for operation from clients.

According to a specific embodiment, a "roll back" may scenario may be described as follows. The gaming software decides to start a game. After an initial determination that a game can start, a list of transactions may be built. The list of transactions may include: 1) record the game to be played, 2) recording the new state of the game, 3) recording the amount of money to be played, 4) recording the amount of money to be subtracted from the players money and 5) notifying the event manager that a game has begun. Normally, these operations would all be completed at once. However, due to the dynamic nature of the system, it is possible that at the last moment, the game can not begin. For instance, an eminent power interruption may prevent the game from beginning. In this example, when the gaming software notifies the event manager that a game is about to be initiated, it may receiving a reply from the operating system not to initiate the game (e.g. power failure detected). In this example, the operations in the transaction list that have been recorded for execution were based upon the assumption that a game would be initiated. If the operations are executed and a game is not initiated, the gaming machine may be left in an incorrect state. For instance, subtracting the player money without initiating a game would be unacceptable to the player or the operator of the gaming machine. Thus, in response to the denial of game play, all the operations are rolled backed. Thus, none of the operations are executed on the transaction list, a game is not played, and the gaming machine is placed in a state before the transaction list was constructed in anticipation of a game play.

According to specific embodiments, the gaming machine RAM will contain at least a portion of the state information relating to the current state of a gaming machine. In order to effectively preserve the current state of the gaming machine (e.g., to allow the current state to be resumed after a power failure, or to allow a "roll back" operation to be performed), at least a portion of the state information stored at the gaming machine RAM must be saved in non-volatile memory (e.g., NV-RAM). According to different embodiments, the Game Manager and/or NV-RAM Manager may be configured or designed to identify the relevant state information (e.g., accumulated information, critical data, global data, etc.) in the gaming machine RAM, and to take appropriate action for saving the identified relevant state information in the NV-RAM. In at least one implementation, jurisdictional gambling rules/regulations may affect the determination of which information in the gaming machine RAM is to be stored in the NV-RAM.

Figure 12:
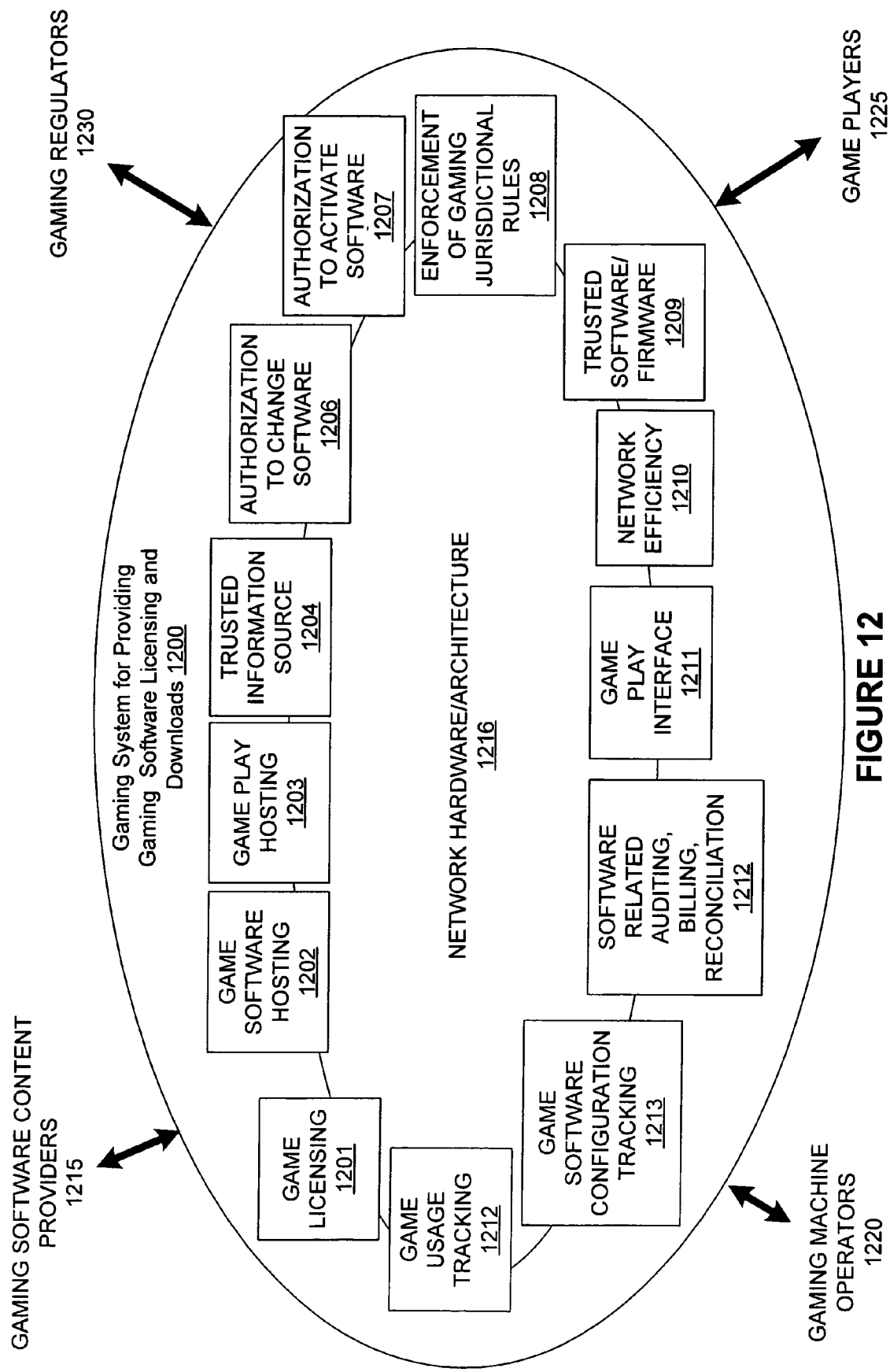
FIG. 12 is a block diagram of a gaming system of the present invention.

FIG. 12 shows a block diagram illustrating components of a gaming system 1200 which may be used for implementing various aspects of the present invention. In FIG. 12, the components of a gaming system 1200 for providing game software licensing and downloads are described functionally. The described functions may be instantiated in hardware, firmware and/or software and executed on a suitable device. In the system 1200, there may be many instances of the same function, such as multiple game play interfaces 1211. Nevertheless, in FIG. 12, only one instance of each function is shown. The functions of the components may be combined. For example, a single device may comprise the game play interface 1211 and include trusted memory devices or sources 1209.

The gaming system 1200 may receive inputs from different groups/entities and output various services and or information to these groups/entities. For example, game players 1225 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 1200, receive revenue for the use of their software and compensate the gaming machine operators. The gaming regulators 1230 may provide rules and regulations that must be applied to the gaming system and may receive reports and other information confirming that rules are being obeyed.

In the following paragraphs, details of each component and some of the interactions between the components are described with respect to FIG. 12. The game software license host 1201 may be a server connected to a number of remote gaming devices that provides licensing services to the remote gaming devices. For example, in other embodiments, the license host 1201 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 1215 may track the usage of game software on a plurality of devices in communication with the host. The game usage-tracking host 1215 may be in communication with a plurality of game play hosts and gaming machines. From the game play hosts and gaming machines, the game usage tracking host 1215 may receive updates of an amount that each game available for play on the devices has been played and on amount that has been wagered per game. This information may be stored in a database and used for billing according to methods described in a utility based licensing agreement.

The game software host 1202 may provide game software downloads, such as downloads of game software or game firmware, to various devious in the game system 1200. For example, when the software to generate the game is not available on the game play interface 1211, the game software host 1202 may download software to generate a selected game of chance played on the game play interface. Further, the game software host 1202 may download new game content to a plurality of gaming machines via a request from a gaming machine operator.

In one embodiment, the game software host 1202 may also be a game software configuration-tracking host 1213. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 1203 may be a host server connected to a plurality of remote clients that generates games of chance that are displayed on a plurality of remote game play interfaces 1211. For example, the game play host device 1203 may be a server that provides central determination for a bingo game play played on a plurality of connected game play interfaces 1211. As another example, the game play host device 1203 may generate games of chance, such as slot games or video card games, for display on a remote client. A game player using the remote client may be able to select from a number of games that are provided on the client by the host device 1203. The game play host device 1203 may receive game software management services, such as receiving downloads of new game software, from the game software host 1202 and may receive game software licensing services, such as the granting or renewing of software licenses for software executed on the device 1203, from the game license host 1201.

In particular embodiments, the game play interfaces or other gaming devices in the gaming system 1200 may be portable devices, such as electronic tokens, cell phones, smart cards, tablet PC's and PDA's. The portable devices may support wireless communications and thus, may be referred to as wireless mobile devices. The network hardware architecture 1216 may be enabled to support communications between wireless mobile devices and other gaming devices in gaming system. In one embodiment, the wireless mobile devices may be used to play games of chance.

The gaming system 1200 may use a number of trusted information sources. Trusted information sources 1204 may be devices, such as servers, that provide information used to authenticate/activate other pieces of information. CRC values used to authenticate software, license tokens used to allow the use of software or product activation codes used to activate to software are examples of trusted information that might be provided from a trusted information source 1204. Trusted information sources may be a memory device, such as an EPROM, that includes trusted information used to authenticate other information. For example, a game play interface 1211 may store a private encryption key in a trusted memory device that is used in a private key-public key encryption scheme to authenticate information from another gaming device.

When a trusted information source 1204 is in communication with a remote device via a network, the remote device will employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 1200 of the present invention may include devices 1206 that provide authorization to download software from a first device to a second device and devices 1207 that provide activation codes or information that allow downloaded software to be activated. The devices, 1206 and 1207, may be remote servers and may also be trusted information sources. One example of a method of providing product activation codes that may be used with the present invention is describes in previously incorporated U.S. Pat. No. 6,264,561.

A device 1206 that monitors a plurality of gaming devices to determine adherence of the devices to gaming jurisdictional rules 1208 may be included in the system 1200. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1200 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 1216 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 1210 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 1212. For example, a software licensing billing server may generate a bill for a gaming device operator based upon a usage of games over a time period on the gaming devices owned by the operator. In another example, a software auditing server may provide reports on game software downloads to various gaming devices in the gaming system 1200 and current configurations of the game software on these gaming devices.

At particular time intervals, the software auditing server 1212 may also request software configurations from a number of gaming devices in the gaming system. The server may then reconcile the software configuration on each gaming device. In one embodiment, the software auditing server 1212 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 12. Many of the interactions are coupled. For example, methods used for game licensing may affect methods used for game downloading and vice versa. For the purposes of explanation, details of a few possible interactions between the components of the system 1200 relating to software licensing and software downloads have been described. The descriptions are selected to illustrate particular interactions in the game system 1200. These descriptions are provided for the purposes of explanation only and are not intended to limit the scope of the present invention.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for managing non-volatile memory resources at a gaming machine, the gaming machine being configured or designed to receive a wager on a game of chance, the gaming machine including a first non-volatile memory source adapted to store accumulated information relating to activities at the gaming machine, the gaming machine including a second non-volatile memory source adapted to store accumulated information relating to activities at the gaming machine, the method comprising:

receiving a game activation request to activate or add a first game at the gaming machine;

generating, in response to the game activation request, a memory allocation request for allocating a first portion of memory space at the first non-volatile memory source;

determining whether there is sufficient memory space available at the first non-volatile memory source for allocating the first portion of memory space;

automatically identifying for de-allocation a second game at the gaming machine in response to a determination that there is insufficient memory space available at the first non-volatile memory source for allocating the first portion of memory space, wherein the second game has associated therewith a first existing allocated portion of memory space at the first non-volatile memory source, the first existing allocated portion of memory space storing data that includes second game accumulated information relating to the second game;

in response to the determination that there is insufficient memory space available at the first non-volatile memory source for allocating the first portion of memory space, doing the following:

converting a first portion of the second game accumulated information stored in the first existing allocated portion of memory space into converted second game accumulated information which is in a format that is able to be interpreted during a time period when game code relating to the second game is unavailable for access;

storing the converted second game accumulated information in a second allocated portion of memory space at the second non-volatile memory source;

updating reference information relating to the first portion of the second game accumulated information and stored in the first non-volatile memory source to reference the converted second game accumulated information stored in the second allocated portion of memory space at the second non-volatile memory source; and automatically initiating a procedure for de-allocating the first existing allocated portion of memory space at the first non-volatile memory source.

2. The method of claim 1 further comprising:
identifying a second existing allocated portion of memory space at the first non-volatile memory source which is to be preserved during the de-allocation of the first existing allocated portion of memory space; and
de-allocating the first existing allocated portion of memory space at the first non-volatile memory source while preserving the second existing allocated portion of memory space at the first non-volatile memory source.

3. The method of claim 1 wherein the first portion of memory space is operable for storing accumulated information associated with the first game.

4. The method of claim 1:
wherein the first portion of memory space is operable for storing accumulated information associated with the first game; and
wherein the accumulated information comprises critical data generated during plays of the first game.

5. The method of claim 1, further comprising:
generating, in response to said game activation instructions, the memory allocation request for allocating the first portion of memory space at the first non-volatile memory source;
wherein the first portion of memory space is adaptable for storing accumulated information associated with the first game; and
wherein the accumulated information comprises one or more of: game history information, security information, accounting information, player tracking information, wide area progressive information, game state information, game usage information, game transactional information, game meter information, bonus of game information, and player input information.

6. The method of claim 1:
wherein the first non-volatile memory source corresponds to non-volatile RAM; and
wherein the second non-volatile memory source corresponds to disk drive memory.

7. A method for managing non-volatile memory resources at a gaming machine, the gaming machine being configured or designed to receive a wager on a game of chance, the gaming machine including a first non-volatile memory source adapted to store accumulated information relating to activities at the gaming machine, the gaming machine including a second non-volatile memory source adapted to store accumulated information relating to activities at the gaming machine, the method comprising:

receiving a memory allocation request for allocating a first portion of memory space at the first non-volatile memory source, wherein the memory allocation request relates to a first game which is to be activated at the gaming machine;

determining whether first game accumulated information relating to the first game is stored at the second non-volatile memory source; and when it is determined that first game accumulated information relating to the first game is stored at the second non-volatile memory source, doing the following:

converting the first game accumulated information into converted first game accumulated information which is in a format that is able to be interpreted during a time period when game code relating to the first game is unavailable for access;

allocating the first portion of memory space in the first non-volatile memory source for storing the converted first game accumulated information;

populating the allocated first portion of memory space in the first non-volatile memory source with the converted first game accumulated information; and updating reference information relating to the first game accumulated information and stored in the second non-volatile memory source to reference the converted first game accumulated information stored in the allocated first portion of memory space at the first non-volatile memory source.

8. The method of claim 7 further comprising:
identifying an available portion of memory space at the first non-volatile memory source for allocating the first portion of memory space relating to the first game;
identifying an existing allocated portion of memory space at the first non-volatile memory source which includes accumulated information associated with a second game at the gaming machine; and
allocating the available portion of memory space at the first non-volatile memory source for storing accumulated information associated with the first game while preserving the information stored in the existing allocated portion of memory space at the first non-volatile memory source.

9. The method of claim 7:
wherein the first non-volatile memory source corresponds to non-volatile RAM; and
wherein the second non-volatile memory source corresponds to disk drive memory.

10. A method for managing non-volatile memory resources at a gaming machine, the gaming machine being configured or designed to receive a wager on a game of chance, the gaming machine including a first non-volatile memory source adapted to store accumulated information relating to activities at the gaming machine, the gaming machine including a second non-volatile memory source adapted to store accumulated information relating to activities at the gaming machine, the method comprising:

receiving a first memory de-allocation request for de-allocating a first allocated portion of memory space at the first non-volatile memory source, wherein the first allocated portion of memory space includes first game accumulated information relating to a first game at the gaming machine;
in response to the first memory de-allocation request, doing the following:
converting a first portion of the first game accumulated information into converted first game accumulated information which is in a format that is able to be interpreted during a time period when game code relating to the first game is unavailable for access:
storing the converted first game accumulated information in a second allocated portion of memory space at the second non-volatile memory source;
updating reference information relating to the first portion of the first game accumulated information and stored in the first non-volatile memory source to reference the converted first game accumulated information stored in the second allocated portion of memory space at the second non-volatile memory source; and
de-allocating the first allocated portion of memory space at the first non-volatile memory source.

11. The method of claim 10 further comprising:
allocating the second allocated portion of memory space at the second non-volatile memory source;
wherein the second allocated portion of memory space is adapted to store first game accumulated information relating to gaming machine activity associated with the first game.

12. The method of claim 10 further comprising:
identifying a second existing allocated portion of memory space at the first non-volatile memory source which is to be preserved during the de-allocation of the first existing allocated portion of memory space; and
de-allocating the first existing allocated portion of memory space at the first non-volatile memory source while preserving the second existing allocated portion of memory space at the first non-volatile memory source.

13. The method of claim 10 further comprising:
receiving a first game removal request for deactivating a first game at the gaming machine; and
generating the first memory de-allocation request in response to the first game removal request.

14. The method of claim 10 wherein the first game accumulated information comprises critical data generated during plays of the first game at the gaming machine.

15. The method of claim 10 wherein the first game accumulated information comprises one or more of: game history information, security information, accounting information, player tracking information, wide area progressive information, game state information, game usage information, game transactional information, game meter information, bonus of game information, and player input information.

16. The method of claim 10: wherein the first non-volatile memory source corresponds to non-volatile RAM; and
wherein the second non-volatile memory source corresponds to disk drive memory.

17. A gaming machine configured or designed to receive a wager on a game of chance, the gaming machine comprising:
a processor;
a interface;
a first non-volatile memory source adapted to store accumulated information relating to activities at the gaming machine; and
a second non-volatile memory source adapted to store accumulated information relating to activities at the gaming machine;
the gaming machine being adapted to:
receive a memory allocation request for allocating a first portion of memory space at the first non-volatile memory source;
determine whether there is sufficient memory space available at the first non-volatile memory source for allocating the first portion of memory space;
in response to the determination that there is insufficient memory space available at the first non-volatile memory source for allocating the first portion of memory space, do the following:
convert a first portion of second game accumulated information stored in the first non-volatile memory source into converted second game accumulated information which is in a format that is able to be interpreted during a time period when game code relating to the second game is unavailable for access;
store the converted second game accumulated information in the second non-volatile memory source;
update reference information relating to the first portion of the second game accumulated information and stored in the first non-volatile memory source to reference the converted second game accumulated information stored in the second non-volatile memory source; and
automatically initiate a procedure for de-allocating an existing allocated portion of memory space at the first non-volatile memory source.

18. The gaming machine of claim 17 being further configured or designed to:
identify a first existing allocated portion of memory space at the first non-volatile memory source for de-allocation;
identify a second existing allocated portion of memory space at the first non-volatile memory source which is to be preserved during the de-allocation of the first existing allocated portion of memory space; and
de-allocate the first existing allocated portion of memory space at the first non-volatile memory source while preserving the second existing allocated portion of memory space at the first non-volatile memory source.

19. The gaming machine of claim 17 wherein the memory allocation request relates to a first game which is to be added, mounted or activated at the gaming machine.

20. The gaming machine of claim 17 being further configured or designed to:
generate, in response to said game activation instructions, the memory allocation request for allocating the first portion of memory space at the first non-volatile memory source;
wherein the first portion of memory space is adaptable for storing accumulated information associated with the first game.

21. The gaming machine of claim 17, being further configured or designed to:
generate, in response to said game activation instructions, the memory allocation request for allocating the first portion of memory space at the first non-volatile memory source;
wherein the first portion of memory space is adaptable for storing accumulated information associated with the first game; and
wherein the accumulated information comprises critical data generated during plays of the first game.

22. The gaming machine of claim 17, being further configured or designed to:

generate, in response to said game activation instructions, the memory allocation request for allocating the first portion of memory space at the first non-volatile memory source;
wherein the first portion of memory space is adaptable for storing accumulated information associated with the first game; and
wherein the accumulated information comprises one or more of: game history information, security information, accounting information, player tracking information, wide area progressive information, game state information, game usage information, game transactional information, game meter information, bonus of game information, and player input information.

23. The gaming machine of claim 17:
wherein the first non-volatile memory source corresponds to non-volatile RAM; and
wherein the second non-volatile memory source corresponds to disk drive memory.

24. A gaming machine configured or designed to receive a wager on a game of chance, the gaming machine comprising:
a processor;
an interface;
a first non-volatile memory source adapted to store accumulated information relating to activities at the gaming machine; and
a second non-volatile memory source adapted to store accumulated information relating to activities at the gaming machine;
the gaming machine being adapted to:
receive a memory allocation request for allocating a first portion of memory space at the first non-volatile memory source, wherein the memory allocation request relates to a first game which is to be activated at the gaming machine;
determine whether first game accumulated information relating to the first game is stored at the second non-volatile memory source; and
when it is determined that first game accumulated information relating to the first game is stored at the second non-volatile memory source, do the following:
convert at least a portion of the first game accumulated information retrieved from the second non-volatile memory source into converted first game accumulated information which is in a format that is able to be interpreted during a time period when game code relating to the first game is unavailable for access;
allocate the first portion of memory space at the first non-volatile memory source with the converted first game accumulated information;
populate the allocated first portion of memory space at the first non-volatile memory source with the converted first game accumulated information; and
update reference information relating to the first game accumulated information and stored in the second non-volatile memory source to reference the converted first game accumulated information stored in the allocated first portion of memory space at the first non-volatile memory source.

25. The gaming machine of claim 24 being further configured or designed to:
identify an available portion of memory space at the first non-volatile memory source for allocating the first portion of memory space relating to the first game;
identify an existing allocated portion of memory space at the first non-volatile memory source which includes accumulated information associated with a second game at the gaming machine; and
allocate the available portion of memory space at the first non-volatile memory source for storing accumulated information associated with the first game while preserving the information stored in the existing allocated portion of memory space at the first non-volatile memory source.

26. The gaming machine of claim 24:
wherein the first non-volatile memory source corresponds to non-volatile RAM; and
wherein the second non-volatile memory source corresponds to disk drive memory.

27. A gaming machine configured or designed to receive a wager on a game of chance, the gaming machine comprising:
a processor;
a interface;
a first non-volatile memory source adapted to store accumulated information relating to activities at the gaming machine; and
a second non-volatile memory source adapted to store accumulated information relating to activities at the gaming machine;
the gaming machine being adapted to:
receive a first memory de-allocation request for de-allocating a first allocated portion of memory space at the first non-volatile memory source, wherein the first allocated portion of memory space includes first game accumulated information relating to a first game at the gaming machine;
in response to the first memory de-allocation request, do the following:
convert a first portion of the first game accumulated information into converted first game accumulated information which is in a format that is able to be interpreted during a time period when game code relating to the first game is unavailable for access;
store the converted first game accumulated information in a second allocated portion of memory space at the second non-volatile memory source;
update reference information relating to the first portion of the first game accumulated information and stored in the first non-volatile memory source to reference the converted first game accumulated information stored in the second allocated portion of memory space at the second non-volatile memory source; and
de-allocate the first allocated portion of memory space at the first non-volatile memory source.

28. The gaming machine of claim 27 being further configured or designed to:
allocate the second allocated portion of memory space at the second non-volatile memory source;
wherein the second allocated portion of memory space is adapted to store first game accumulated information relating to gaming machine activity associated with the first game.

29. The gaming machine of claim 27 being further configured or designed to:
identify a second existing allocated portion of memory space at the first non-volatile memory source which is to be preserved during the de-allocation of the first existing allocated portion of memory space; and
de-allocating the first existing allocated portion of memory space at the first non-volatile memory source while preserving the second existing allocated portion of memory space at the first non-volatile memory source.

30. The gaming machine of claim 27 being further configured or designed to:
- receive a first game removal request for deactivating a first game at the gaming machine; and
- generate the first memory de-allocation request in response to the first game removal request.

31. The gaming machine of claim 27 wherein the first game accumulated information comprises critical data generated during plays of the first game at the gaming machine.

32. The gaming machine of claim 27 wherein the first game accumulated information comprises one or more of: game history information, security information, accounting information, player tracking information, wide area progressive information, game state information, game usage information, game transactional information, game meter information, bonus of game information, and player input information.

33. The gaming machine of claim 27:
- wherein the first non-volatile memory source corresponds to non-volatile RAM; and
- wherein the second non-volatile memory source corresponds to disk drive memory.

\* \* \* \* \*